United States Patent
Matsuno et al.

(10) Patent No.: US 7,873,139 B2
(45) Date of Patent: Jan. 18, 2011

(54) SIGNAL PROCESSING DEVICE

(75) Inventors: Noriaki Matsuno, Kawasaki (JP); Yoshinori Horiguchi, Kawasaki (JP); Yuu Yamaguchi, Kawasaki (JP); Orie Tsuzuki, Kawasaki (JP); Tomonobu Kurihara, Kawasaki (JP); Isao Sakakida, Kawasaki (JP); Tadashi Maeda, Minato-ku (JP); Tomoyuki Yamase, Minato-ku (JP)

(73) Assignees: NEC Corporation, Tokyo (JP); Renesas Electronics Corporation, Kanagawa (JP)

( * ) Notice: Subject to any disclaimer, the term of this patent is extended or adjusted under 35 U.S.C. 154(b) by 102 days.

(21) Appl. No.: 12/414,132

(22) Filed: Mar. 30, 2009

(65) Prior Publication Data
US 2009/0245454 A1    Oct. 1, 2009

(30) Foreign Application Priority Data
Mar. 31, 2008 (JP) ............................. 2008-090105

(51) Int. Cl.
*G01F 15/06* (2006.01)
*H03K 5/19* (2006.01)

(52) U.S. Cl. ............................. 377/19; 327/18; 327/21; 327/37; 327/47; 327/48

(58) Field of Classification Search ....................... None
See application file for complete search history.

(56) References Cited

U.S. PATENT DOCUMENTS

| 4,467,433 A * | 8/1984 | Claassen et al. ............... 702/66 |
| 4,864,158 A * | 9/1989 | Koelle et al. .................. 327/31 |
| 5,123,034 A * | 6/1992 | Grujon ......................... 377/19 |
| 2006/0293009 A1* | 12/2006 | Kobayashi ............... 455/232.1 |

FOREIGN PATENT DOCUMENTS

| JP | 04-291167 A | 10/1992 |
| JP | 08-032510 A | 2/1996 |
| JP | 2561023 B2 | 12/1996 |
| JP | 2605827 B2 | 4/1997 |
| JP | 09-162644 A | 6/1997 |
| JP | 2006-148239 A | 6/2006 |

* cited by examiner

*Primary Examiner*—Tuan Lam
(74) *Attorney, Agent, or Firm*—Sughrue Mion, PLLC

(57) ABSTRACT

A signal processing device includes a detecting part that detects intensity of an input signal, a timer part that includes a time constant circuit and measures time based on a time constant of the time constant circuit, and a determination circuit that counts the number of times of switching of the input signal detected by the detecting part within the time measured by the time constant circuit.

18 Claims, 39 Drawing Sheets

SIGNAL PROCESSING DEVICE

BACKGROUND

1. Field of the Invention

The present invention relates to a signal processing device, and more particularly, to a signal processing device capable of accurately estimating incoming of a desired signal based on burst frequency or duration time of an input signal.

2. Description of Related Art

In wireless communication devices, it has been required to increase battery life time including stand-by or idle time. In order to meet this requirement, one known method is that a simple signal processing device and main wireless device are prepared and the simple signal processing device detects incoming of radio wave.

For example, Japanese Unexamined Patent Application Publication No. 8-032510 (patent document 1) discloses a circuit that determines presence or absence of a radio signal using a diode detector. As the technique of the patent document 1 does not employ a local signal generating system that consumes large power, it is essentially possible to decrease power consumption. Further, according to the technique of the patent document 1, detecting the radio signal with higher sensitivity is made possible by using an improved diode detector.

Further, the patent document 1 further discloses a circuit which detects that the intensity of the received radio wave exceeds the predetermined intensity, generates a signal having a certain pulse width according to the detection, inputs this signal to an integration circuit, and compares the integrated signal with a predetermined voltage. This technique brings higher likelihood of desired-signal-detection when the desired signal has a certain turn on and off frequency. On the other hand, when the signal is turns on and off with enough lower frequency compared to the desired signal, this signal is classified into an undesired one and is not detected. The similar technique in which an improved diode detector is used includes Japanese Unexamined Patent Application Publication No. 2006-148239 (patent document 2), Japanese Patent No. 2561023 (patent document 3), Japanese Patent No. 2605827 (patent document 4), Japanese Unexamined Patent Application Publication No. 4-291167 (patent document 5), and Japanese Unexamined Patent Application Publication No. 9-162644 (patent document 6).

SUMMARY

The technique in the patent document 1 determines the incoming of the desired radio wave by detecting that the intensity of the received radio wave exceeds the predetermined intensity, generating a signal having a certain pulse width according to the detection, inputting this signal to an integration circuit, and comparing the integrated signal with a predetermined voltage. However, the present inventors have found two issues as follows in the technique disclosed in the patent document 1.

One is that the signal turning on and off more frequently than the desired radio wave is detected. The other one is that the signal repeating turn-on and turn-off for a much longer time than the desired radio wave is detected even though the turn-on and turn-off frequency is lower than the desired radio wave. The second problem may be addressed by decreasing the time constant of the integration circuit. However, there is a constraint in realizing a function that the signal notifying the detection is held for a certain period of time even after the interruption of the desired radio wave.

Further, the techniques disclosed in the patent documents 2 to 6 determine the incoming of the desired radio wave only by the magnitude of the radio wave intensity, and result in higher likelihood of false detection caused by undesired radio wave. This problem is not overcome even with an improved diode detector for higher sensitivity.

Furthermore, as shown in FIG. 35, there is also a technique in which a determination logic circuit is combined with a detection circuit using the techniques disclosed in the patent documents 1 to 6, and the appearance interval or frequency, and the duration time of the detected signal are detected, so as to decrease the false detection of the signal. However, in this case, the logic clock signal supplied from outside the circuit sneaks to the detection circuit, and lowers sensitivity.

A first exemplary aspect of an embodiment of the present invention is a signal processing device, including a detecting part that detects intensity of an input signal, a timer that includes a time constant circuit and measures time based on a time constant of the time constant circuit, and a determination circuit that counts the number of times of switching of the input signal detected by the detecting part within the time measured by the time constant circuit.

In the signal processing device according to the present invention, the intensity of the input signal is detected in time period based on the time constant included in the time constant circuit, and the input signal is examined by the detection result, so as to determine whether the input signal is the desired signal. As there is no need to provide a clock for the timer, the clock signal does not sneak to the detection circuit.

According to the present invention, it is possible to reduce the probability of false detection caused by the undesired signals.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
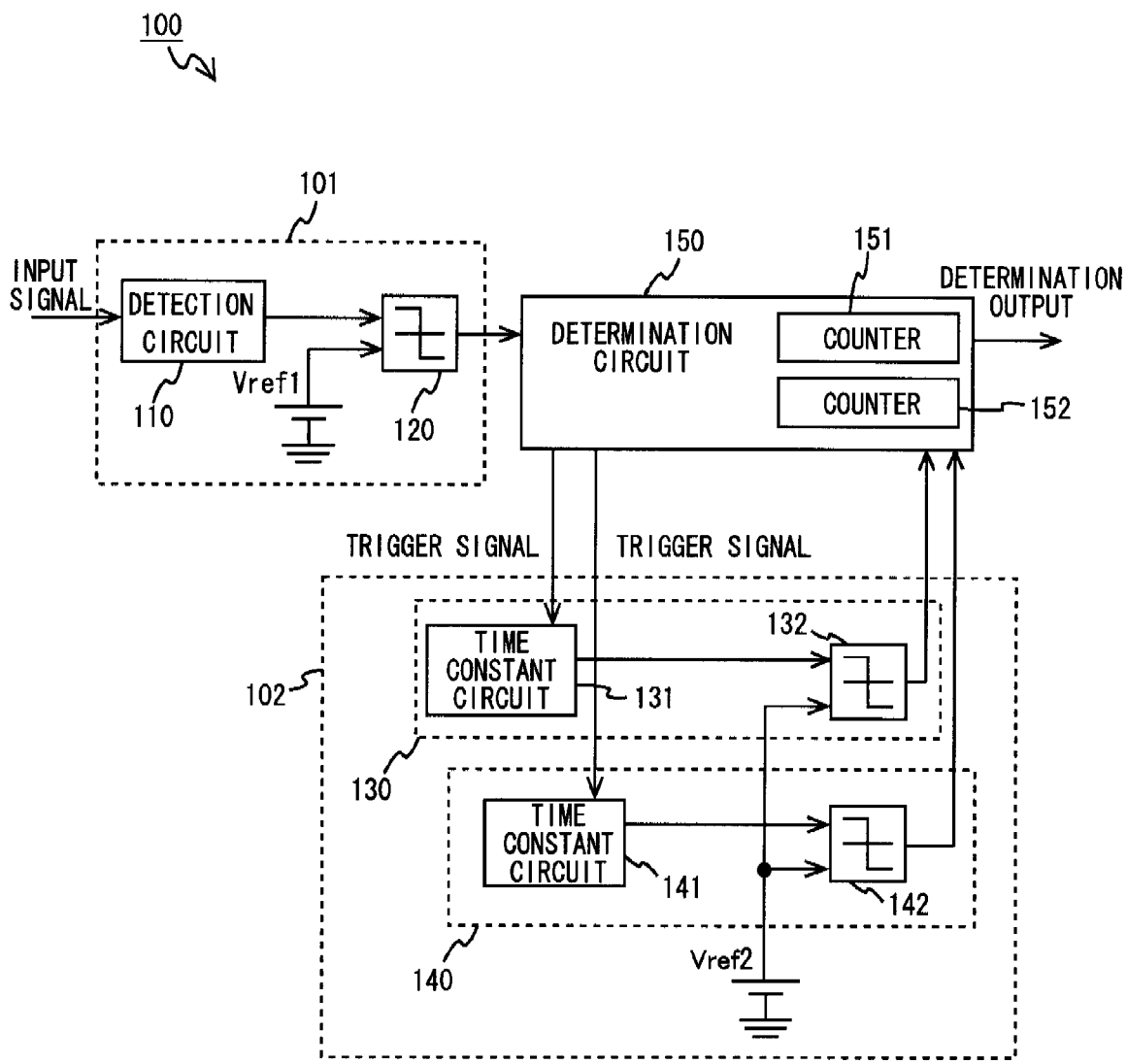
FIG. 1 shows a configuration of a signal processing device according to a first exemplary embodiment.
Figure 2A:
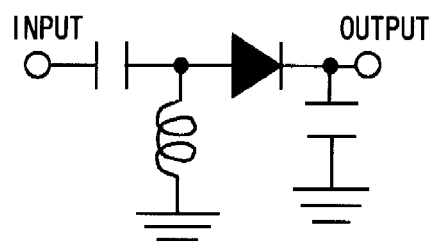
FIG. 2A shows a configuration of a detection circuit according to the first exemplary embodiment.
Figure 2B:
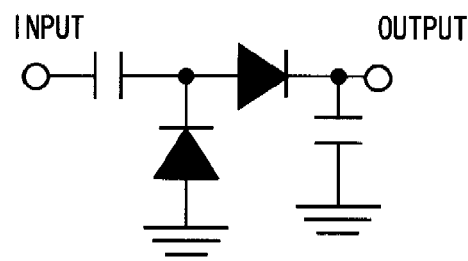
FIG. 2B shows a configuration of the detection circuit according to the first exemplary embodiment.
Figure 2C:
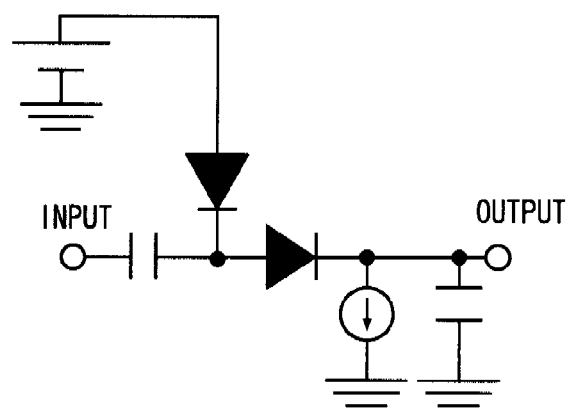
FIG. 2C shows a configuration of the detection circuit according to the first exemplary embodiment.
Figure 2D:
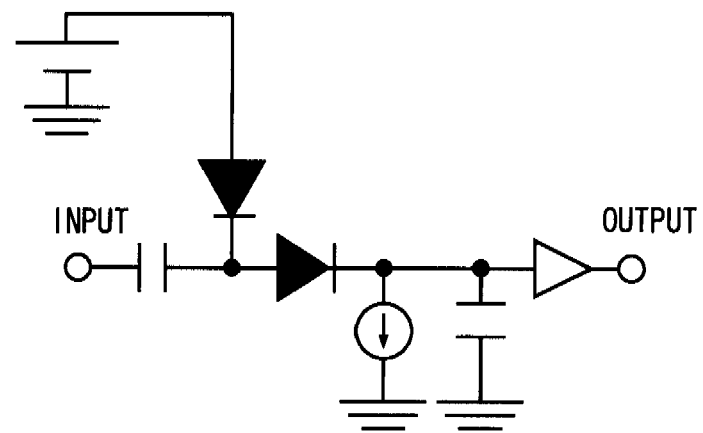
FIG. 2D shows a configuration of the detection circuit according to the first exemplary embodiment.
Figure 2E:
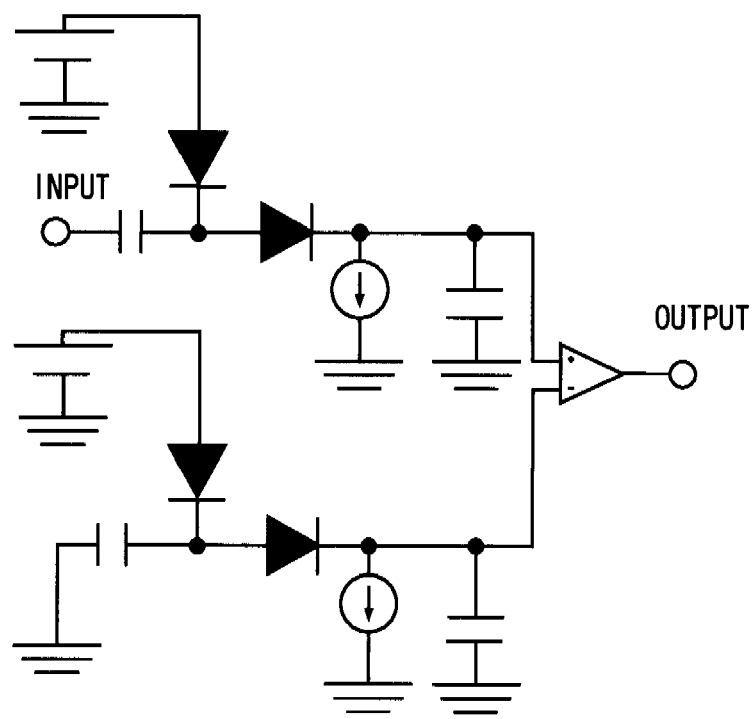
FIG. 2E shows a configuration of the detection circuit according to the first exemplary embodiment.

The specific first exemplary embodiment to which the present invention is applied will be described in detail with reference to the drawings. FIG. 1 shows a configuration of a signal processing device 100 according to the first exemplary embodiment. The signal processing device 100 includes a detecting part 101, a timer block 102, and a determination circuit 150. The detecting part 101 includes a detection circuit 110 and a discrimination circuit 120. The timer block 102 includes timers 130 and 140.

The detection circuit 110 detects a high-frequency input signal, and outputs the detection signal to the discrimination circuit 120. The configuration of the detection circuit 110 includes a diode detector shown in FIGS. 2A to 2E, for example. Note that, the detection circuits shown in FIGS. 2A to 2E have a well-known configuration, and thus the detailed descriptions on its configuration and operation are omitted. Further, the detection circuit may be the one using a bipolar transistor or an MOS transistor in diode connection. Alternatively, the detection circuit may be an amplifier with a bipolar transistor or an MOS transistor biased in class B or class C.

The discrimination circuit 120 compares the detection signal from the detection circuit 110 with a reference voltage Vref1, and outputs the result to the determination circuit 150. When the detection signal voltage from the detection circuit 110 is more than the reference voltage Vref1, the determination circuit 150 outputs a high-level signal. When the detection signal voltage from the detection circuit 110 is less than the reference voltage Vref1, the determination circuit 150 outputs a low-level signal. As such, the detection signal and the noise can be discriminated by using optimum reference voltage Vref1.

Hereinafter, unless otherwise stated, the expression "the detection circuit 110 detects the signal" means that the high-level signal is output from the discrimination circuit 120. Further, the expression "transition from no-signal-detection-state to signal-detection-state of the detection circuit 110"

means that the output signal of discrimination circuit 120 rises. On the other hand, the expression "transition from signal-detection-state to no-signal-detection-state of the detection circuit 110" means that the falling edge of the signal is output from the discrimination circuit 120.

Figure 3A:
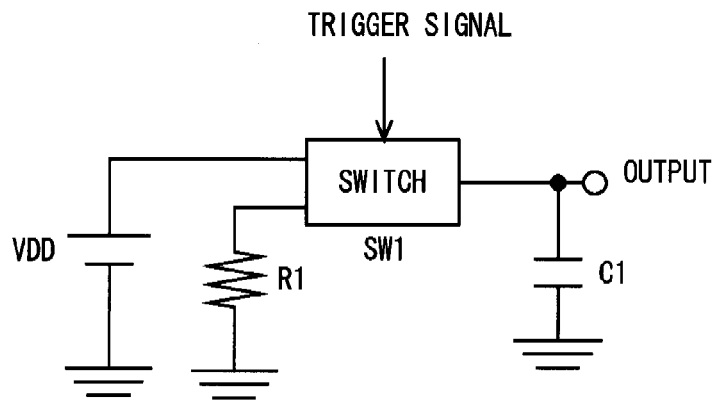
FIG. 3A shows a configuration of a time constant circuit according to the first exemplary embodiment.
Figure 3B:
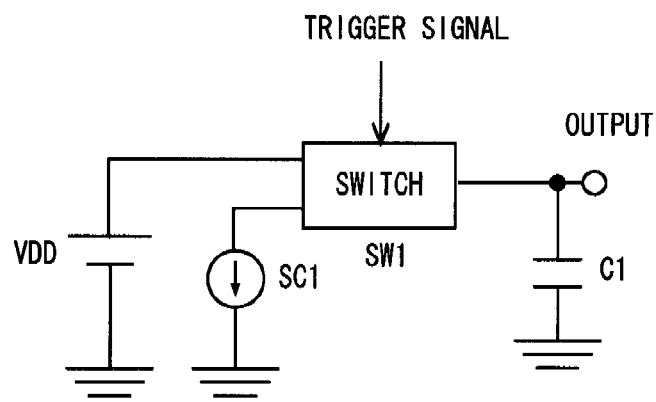
FIG. 3B shows a configuration of the time constant circuit according to the first exemplary embodiment.
Figure 3C:
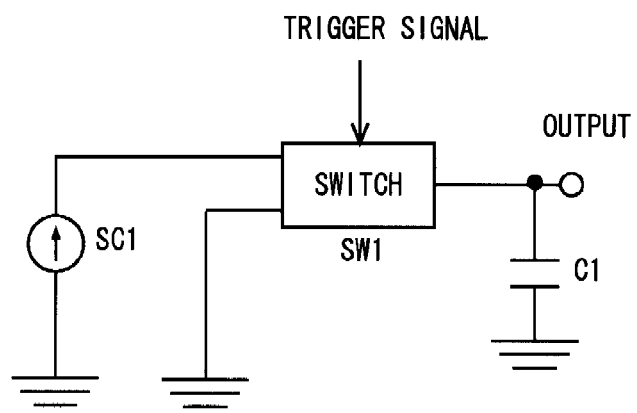
FIG. 3C shows a configuration of the time constant circuit according to the first exemplary embodiment.

The timer 130 includes a time constant circuit 131 and a comparator 132. The time constant circuit 131 may include a circuit having the configuration as shown in FIGS. 3A to 3C, for example. In each circuit shown in FIGS. 3A to 3C, a time constant of charge or discharge of a capacitor C1 is used to perform time measurement. For example, in FIG. 3A, when the trigger signal from the determination circuit 150 is input to a switch SW1, a resistor R1 and the capacitor C1 are connected, so as to discharge the capacitor C1 with a predetermined time constant $\Delta T1$.

The comparator 132 compares the output voltage from the time constant circuit 131 with a reference voltage Vref2, and outputs the comparing result to the determination circuit 150 as a low-level or high level output signal. By adjusting the reference voltage Vref2, the signal can be obtained notifying that the output voltage from the time constant circuit 131 has reached the predetermined threshold voltage (ground voltage GND level +0.1V, for example), which is the signal notifying the end of the time period $\Delta T1$. Further, in the time constant circuit 131, upon the rising edge of the output of the comparator 132, the power supply VDD and the capacitor C1 are connected again, so that the capacitor C1 is charged. Note that, in FIG. 3B, a current source CS1 is connected in place of the resistor R1, and the basic operation is similar to that in FIG. 3A. Further, as shown in FIG. 3C, the current source CS1 may be used for charging the capacitor C1 with the predetermined time constant $\Delta T1$.

As will be understood from the above description, first, the trigger signal is input, then the timer 130 outputs the high-level output signal to the determination circuit 150, after the time period of $\Delta T1$ (hereinafter referred to as period $\Delta T1$) determined by the resistor R1 and so on. In other words, the timer 130 starts its operation with the input of the trigger signal and outputs the high-level output signal after the time of $\Delta T1$.

Hereinafter, unless otherwise stated, the expression "start the discharge of the time constant circuit 131" means that the trigger signal is input and the discharge of the time constant circuit 131 is started. Further, "period $\Delta T1$", "time constant of the timer 130 (131)", and "the discharge voltage of the time constant circuit 131 is higher than the threshold voltage" mean the period before that the high-level signal is output from the comparator 132.

The timer 140 includes a time constant circuit 141 and a comparator 142. The time constant circuit 141 has a configuration that is substantially similar to that of the time constant circuit 131. However, the resistor R1 and so on are set so that the charge or discharge time constant becomes $\Delta T2$. Further, the comparator 142 performs substantially the same operation as that of the comparator 132.

As will be understood from the above description, first, the trigger signal is input, then the timer 140 outputs the high-level output signal to the determination circuit 150, after the time period of $\Delta T2$ (hereinafter referred to as period $\Delta T2$) determined by the resistor R1 and so on. In other words, the timer 140 starts its operation with the input of the trigger signal and outputs the high-level output signal after the time of $\Delta T2$.

Hereinafter, unless otherwise stated, "start the discharge of the time constant circuit 141" means that the trigger signal is input and the discharge of the time constant circuit 141 is started. Further, "period $\Delta T2$", "time constant of the timer 140 (141)", and "the discharge voltage of the time constant circuit 141 is higher than the threshold voltage" mean the period before that the high-level signal is output from the comparator 142.

The determination circuit 150 includes counters 151 and 152. The counters 151 and 152 are controlled by the determination circuit 150, and count up until the value reaches the predetermined value. Further, the counters 151 and 152 stop the each count operation and are reset count values to zero when the value reaches the predetermined value.

Upon detecting the rising edge of the output signal from the discrimination circuit 120, which means when the detection circuit 110 detects a signal, the determination circuit 150 starts the count operation of the counter 151. At the same time, the determination circuit 150 outputs the trigger signal to the time constant circuit 131 of the timer 130. Then, the determination circuit 150 detects the rising or falling edge of the output signal of the discrimination circuit 120 and counts the number during the time constant of the timer 130, which means during the period $\Delta T1$.

When the count value of the counter 151 reaches the predetermined value, "2", for example, the determination circuit 150 makes the counter 152 counting up, and further outputs the trigger signal to the timer 140 to start timer operation. At the same time, the counter 151 stops count operation and is set count value to zero.

After finishing the timer operation of the timer 140, the determination circuit 150 outputs the trigger signal to the timer 130 to start the timer operation. Note that the determination circuit 150 does not output the trigger signal to the timer 130 during the period $\Delta T2$ in which the timer 140 performs the timer operation even when the detection circuit 110 detects a signal.

Then, the determination circuit 150 repeats this operation until when the count value of the counter 152 reaches the predetermined value. When the count value of the counter 152 reaches this predetermined value, "4", for example, the determination circuit 150 outputs the high-level determination signal. At the same time, the counter 152 stops count operation and is set count value to zero.

As stated above, the determination circuit 150 is a logic circuit that operates by the output signals from the discrimination circuit 120 and the timers 130 and 140. The determination circuit 150 includes a function of counting the number of rising or falling edges of the detection signal in the timer operation periods of the timers 130 and 140 using the counters 151 and 152. Thus, the determination circuit 150 performs the logic operation in synchronization only with the output signals from the discrimination circuit 120, and the timers 130 and 140. As such, the determination circuit 150 does not need the input of clock from the clock generating circuit or the like, which becomes the noise source. Now, the operation of the signal processing device 100 including the operation of the determination circuit 150 will be described.

Figure 4:
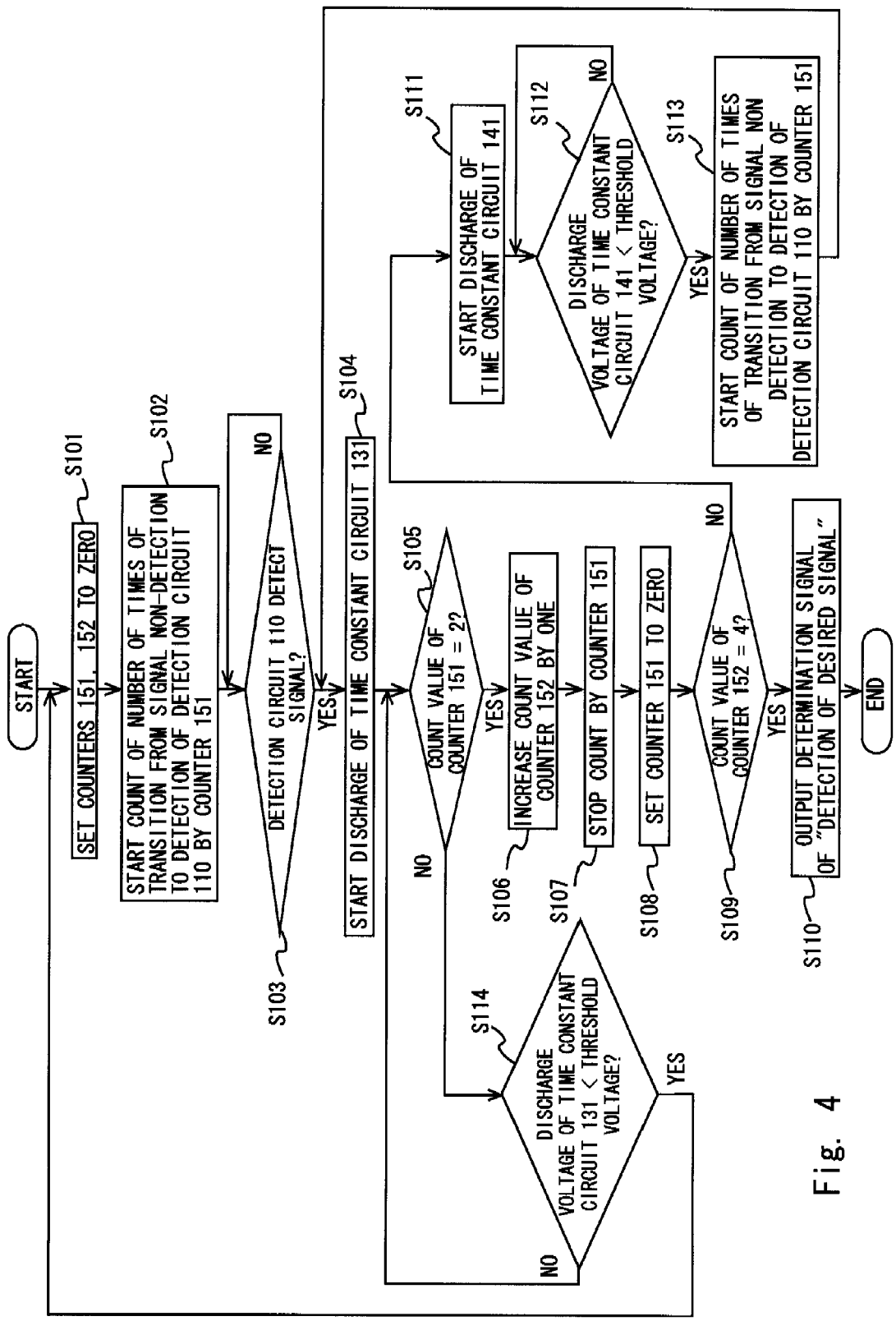
FIG. 4 shows a flow chart of the operation of the signal processing device according to the first exemplary embodiment.

FIG. 4 shows one example of a flow chart of the operation of the signal processing device 100. However, there is no description in the FIG. 4 of the charging operation for the capacitors of the time constant circuits 131 and 141. The charge operation is performed before each discharge operation. The timing of the charge operation can be relatively freely set. It is not the essential part in operating the device.

When the time constant circuits 131 and 141 start the discharge operation, the determination circuit 150 sends trigger signal to each time constant circuit. After each trigger signal is send, the outputs from the comparators 132 and 142 become high level, then the determination circuit 150 detects that the discharge voltage of the time constant circuits 131 and 141 is lower than the threshold voltage. The detection of the signal by the detection circuit 110 means the case in which the high-level signal is input to the determination circuit 150 from the discrimination circuit 120. On the other hand, when the detection circuit 110 does not detect the signal, the low-level signal is input from the discrimination circuit 120 to the determination circuit 150. This operation is the same in other exemplary embodiments as well.

First, the count values of the counters 151 and 152 are reset to zero (S101). Then, the counter 151 counts the number of times of switching (hereinafter referred to as transition) from "no-signal-detection-state" to "signal-detection-state" of the detection circuit 110, or the number of times of the rising edge of the detection signal (S102).

Then, it is monitored whether the detection circuit 110 detects the signal (S103). Upon detection of the signal by the detection circuit 110 (Yes in S103), the discharge operation of the time constant circuit 131 is started (S104). When the detection circuit 110 does not detect the signal (No in S103), the operation goes back to S103 to continue the monitoring operation.

When the count value of the counter 151 is "1" or less (No in S105) and the discharge voltage of the time constant circuit 131 is the predetermined threshold voltage or more (No in S114), the operation goes back to S105. In summary, the timer operation of the timer 130 (discharge operation of the time constant circuit S131) is continued for the period ΔT1. When the discharge voltage of the time constant circuit 131 is less than the predetermined threshold voltage (Yes in S114), it is determined that the desired signal has not been detected, and the operation goes back to the initial state (S101).

When the count value of the counter 151 becomes "2" (Yes in S105), the count value of the counter 152 is increased by "1" (S106), stops the count operation by the counter 151 (S107), and resets the counter 151 to zero (S108).

When the count value of the counter 152 is "4" (Yes in S109), it is determined that the desired signal has been detected, and the high-level determination signal is output (S110).

When the count value of the counter 152 is not "4" (No in S109), the discharge operation of the time constant circuit 141 is started (S111). When the discharge voltage of the time constant circuit 141 is less than the predetermined threshold voltage (Yes in S112), the counter 151 starts the count of the number of times of transition from "no-signal-detection-state" to "signal-detection-state" of the detection circuit 110 (S113), and the operation goes back to S104. When the discharge voltage of the time constant circuit 141 is the predetermined threshold voltage or more (No in S112), the operation goes back to S112. In summary, the timer operation of the timer 140 (discharge operation of the time constant circuit 141) is continued for the period ΔT2.

Figure 5:
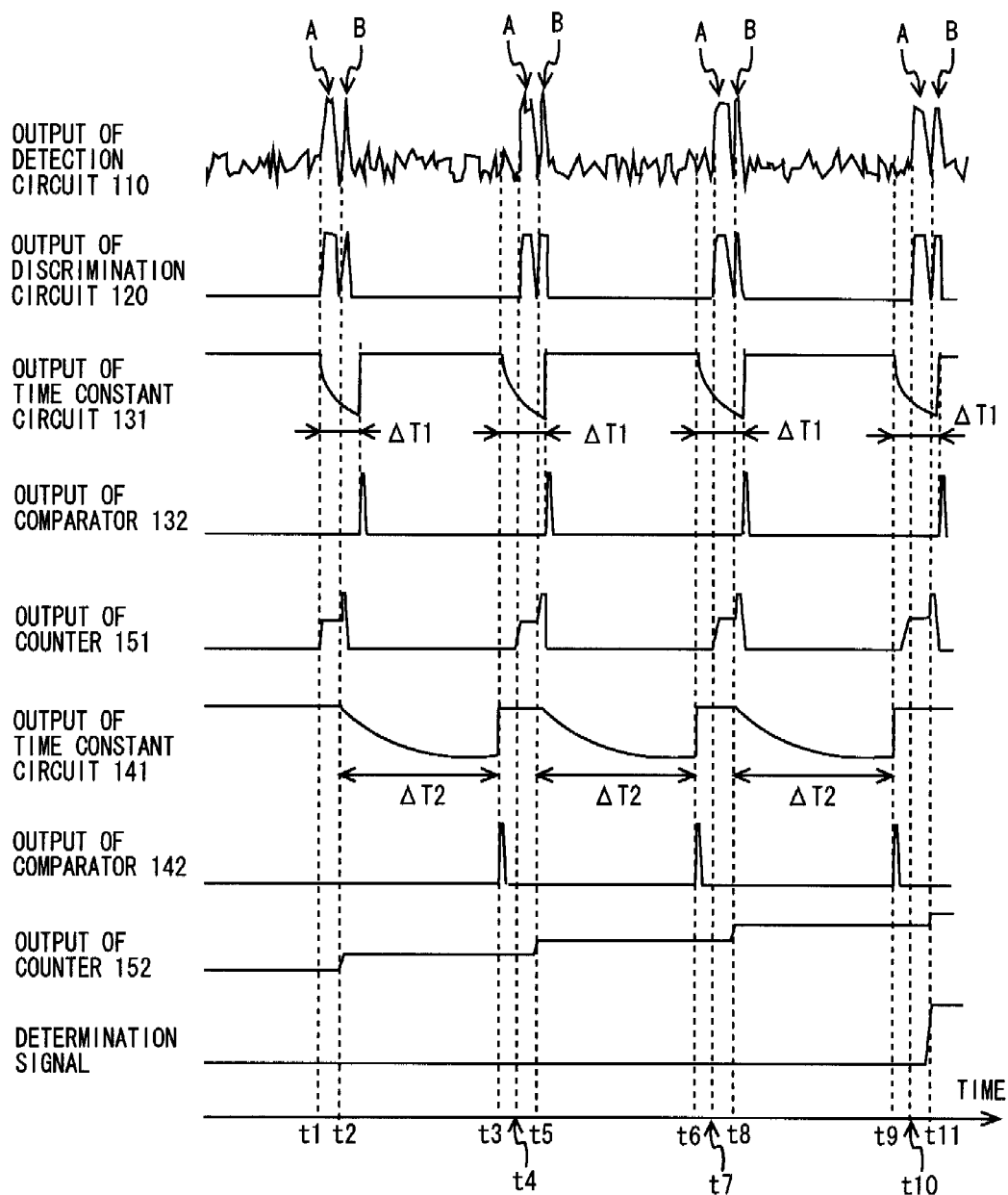
FIG. 5 shows a timing chart of the operation of the signal processing device according to the first exemplary embodiment.

FIG. 5 shows an example of a timing chart of the operation of the signal processing device 100. In this example, it is assumed that only the desired signal is input to the detection circuit 110. This desired signal includes a signal A and a signal B that appear on the output signal of the detection circuit 110. The signal A is long and the signal B is short on the time axis, and they form a pair. The signal processing device is on a terminal (mobile phone or the like). The signal A is a transmission signal from a base station, and the signal B is an ACK signal from other terminal (mobile phone or the like). The pair of the signals A and B is repeated with certain intervals.

First, the transmission signal from the base station is input to the detection circuit 110 at time t1, and the signal A is output as the detection signal. As such, the output signal is raised to high level in accordance with the signal A from the discrimination circuit 120. Further, the trigger signal in accordance with the rising edge of this signal is output from the determination circuit 150 to the timer 130. Then, the discharge of the time constant circuit 131 is started, and the output voltage of the time constant circuit 131 starts to decrease. Further, the counter 151 is set to "1". When the output voltage of the time constant circuit 131 decreases to a predetermined voltage, the output voltage of the comparator 132 is raised to high level. Here, "predetermined voltage" is selected so that the time period between the discharge start of the time constant circuit 131 and raising edge of the comparator 132 output becomes ΔT1. The counter 151 of the determination circuit 150 counts rising edges of the discrimination circuit 120 output in the period ΔT1.

Next, at time t2, the ACK signal transmitted from the other terminal is input to the detection circuit 110, and the signal B is output as the detection output. As such, the output signal from the discrimination circuit 120 raises in accordance with the signal B from the discrimination circuit 120. As the time t2 is within the period ΔT1 from the time t1, the counter 151 counts up in synchronization with the rising edges of the signal from the discrimination circuit 120 in accordance with the signal B, and the count value is set to "2". As the count value becomes "2", the counter 151 is then reset to zero.

In synchronization with the count value of the counter 151 being "2", the trigger signal is output from the determination circuit 150 to the time constant circuit 141 of the timer 140. The discharge of the time constant circuit 141 is started by this trigger signal, and the output voltage starts to decrease. When the output voltage of the time constant circuit 141 decreases to a predetermined voltage, the output voltage of the comparator 142 is raised to high level. Here, "predetermined voltage" is selected so that the time period between the discharge start of the time constant circuit 141 and raising edge of the comparator 142 output becomes ΔT2. The determination circuit 150 does not send the trigger signal to the time constant circuit 131 in the period ΔT2, which is the time from when the trigger signal is sent to the timer 140 to when the output voltage of the comparator 142 is raised to high level. Thus, the time constant circuit 131 does not perform the discharge operation. Accordingly, during the period ΔT2, the counter 151 stops the count up operation. Further, the counter 152 counts up and changes the count value from "0" to "1" in synchronization with the count value of the counter 151 being "2".

Next, the period ΔT2 ends at time t3, which means the discharge voltage of the time constant circuit 141 is less than the predetermined threshold voltage. Then, the output voltage of the comparator 142 raises, and the determination circuit 150 outputs the trigger signal to the timer 130 in synchronization with it. Then, the discharge operation of the time constant circuit 131 is started again by the trigger signal, and the timer operation in the period ΔT1 is started. In the period ΔT1, the counter 151 of the determination circuit 150 counts rising edges of output of the discrimination circuit 120. In summary, the output signal in accordance with the signal A raises from the discrimination circuit 120 at time t4, and the same operation at time t1 is performed. Then, at time t5, the same operation as time t2 is performed. Then, at time t6 to t11, the same operation as time t3, t4, t5 is repeated. Finally, the counter value of the counter 152 becomes "4" at time t11, and the high-level determination signal is output from the determination circuit 150. As the count value becomes "4", the counter 152 is then reset to zero.

Figure 6:
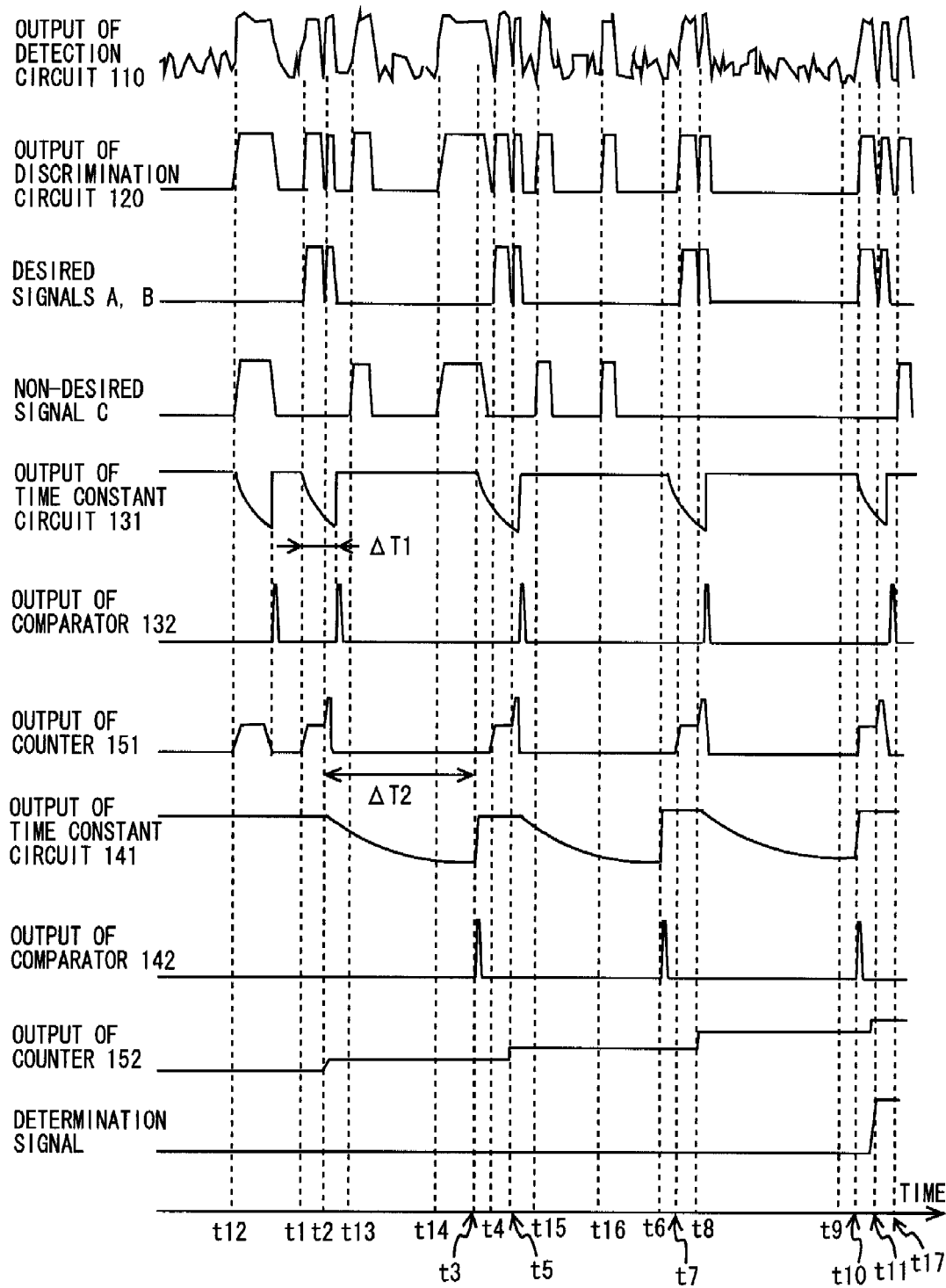
FIG. 6 shows a timing chart of the operation of the signal processing device according to the first exemplary embodiment.

Now, another example of the timing chart of the operation of the signal processing device 100 is shown in FIG. 6. In this example, as is different from FIG. 5, the signal other than the desired signals A and B (hereinafter referred to as undesired signal) is also input to the detection circuit 110. This undesired signal appears as a signal C at the output of the detection circuit 110. In this example, the desired signals A and B, and the undesired signal C are separated in time domain. Further, in order to readily understand the operation of the signal processing device 100 in this example, FIG. 6 shows signal A and B waveform and undesired signal C waveform independently. As the operation of the signal processing device 100 at time t1 to t8 in FIG. 6 has already been described in FIG. 5, it is omitted in FIG. 6.

The undesired signal C is input to the detection circuit 110 at time t12 to t17 in FIG. 6. First, the output of the discrimination circuit 120 rises in accordance with the signal C at time t12. In accordance with it, the discharge operation of the time constant circuit 131 is started, and the output voltage of the time constant circuit 131 starts to decrease. At the same time, the counter 151 of the determination circuit 150 counts rising edges of the output of the discrimination circuit 120. This count is continued until when the output of the comparator 132 rises.

The above operation is similar to what has been described at time t1 in FIG. 5. However, as there is no signal corresponding to the signal B (ACK signal) in the signal C input at time t12, the counter 151 does not count up the count value to "2" in the period ΔT1. Accordingly, the counter 152 does not perform the count operation, and the time constant circuit 141 of the timer 140 does not start the discharge operation. Thus, the state goes back to the initial state at the end of the period ΔT1 has terminated. The above series of operations at time t12 correspond to the operations after No in S105 of the flow chart shown in FIG. 4.

Further, as the undesired signal C that is input at time t13 to t17 is input to the detection circuit 110 in the discharge period ΔT2 of the time constant circuit 141 operating after time t2, the determination circuit 150 does not send the trigger signal to the time constant circuit 131. As such, in the period ΔT2, the time constant circuit 131 does not perform the discharge operation, and the counter 151 stops the count up operation. From the above description, even when the undesired signal C is input, the signal processing device 100 is able to perform the detection of the desired signals A and B with accuracy and the output operation of the determination signal.

As described above, the signal processing device 100 according to the first exemplary embodiment starts the timer operation of the timer 130 upon a rising or falling edge of the output of the discrimination circuit 120. Then, the determination circuit 150 counts rising or falling edges of the output signal of the discrimination circuit 120 during the timer operation period. When the value reaches the predetermined count value, the timer operation is started by the timer 140. Further, the timer operation of the timer 130 is stopped while the timer 140 performs the timer operation. By repeating the above operations, it is possible to determine the characteristics of the input signal, to discriminate the undesired signal, and to accurately extract only the desired signal.

Figure 35:
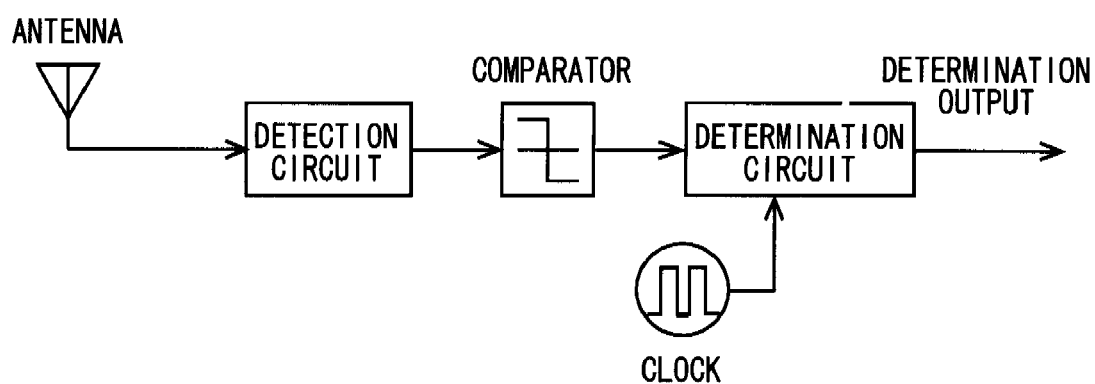
FIG. 35 shows a configuration of a related signal processing device.

Further, it is important in the signal processing device 100 according to the first exemplary embodiment that the time constants of the charge or discharge of the capacitors of the time constant circuits 131 and 141 is used to measure the time. Unlike the related art in FIG. 35, it means that the determination circuit 150 which is the logic circuit does not need the clock from the clock generating circuit or the like which can be a noise source. As such, the sneaking of the logic clock signal to the detection circuit 110 when detecting the rising or the falling edge of the output of the detection circuit 110 can be eliminated. Accordingly, the performance does not degrade even if all the circuits from the detection circuit 110 to the determination circuit 150 are integrated into one chip. Also, when the detection circuit 110 and the determination circuit 150 are fabricated into separate chips and are integrated into a small module, the above-described problem does not occur. Further, the shield of the signal path of the signal processing device 100 can be simplified. This effect is obtained also in other exemplary embodiments.

Compared with the technique of the patent document 1, the signal processing device 100 of the first exemplary embodiment uses the counters 151 and 152 counting the rising or the falling edges of the output signal of the discrimination circuit 120. Thus, the signal which turns on and off more frequently than desired signal does not cause false detection.

In order to effectively use such a function, an example of using the present invention may include a signal processing device that generates an activating signal to activate a wireless device which is in a stand-by state, or a signal processing device or the like for monitoring a communication status to investigate the type of the wireless communication.

The above advantage can be obtained no matter how the operation realized by combination of the components shown in FIG. 1 is combined. Thus, various exemplary embodiments may be conceived other than the flow chart of the operation shown in FIG. 4. For example, there is a case in which the count value of the counter 151 is changed from "2" to "3" in the operation of S105 of FIG. 4.

Figure 7:
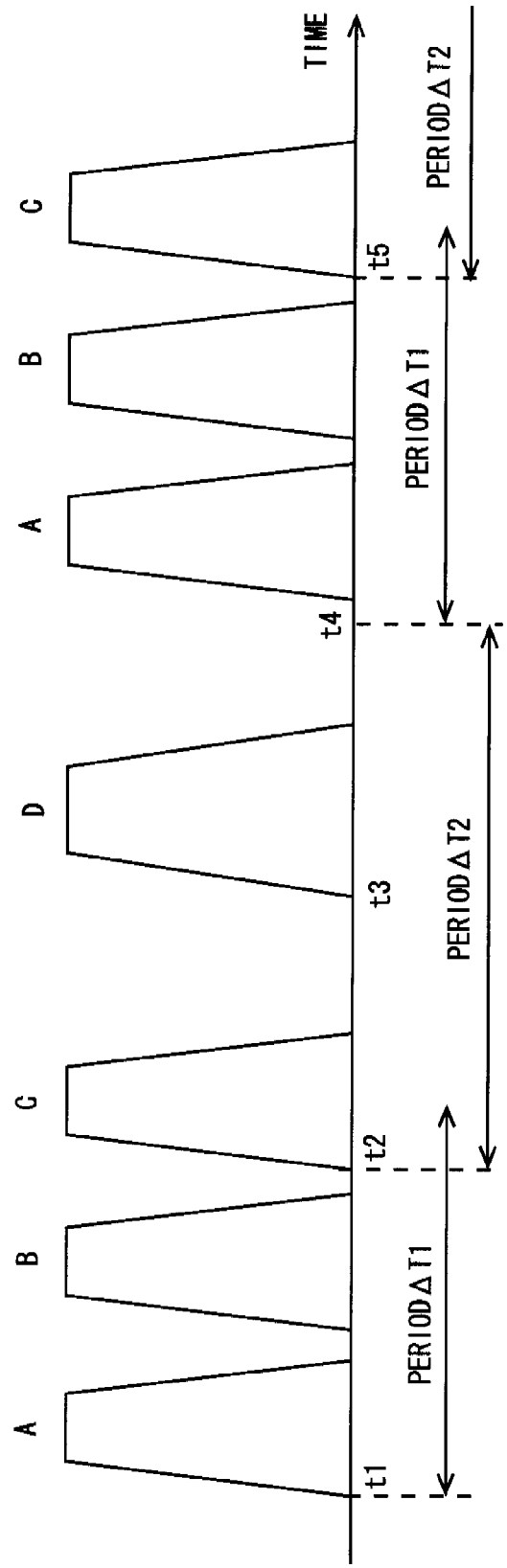
FIG. 7 shows a schematic diagram for describing the operation of the signal processing device according to the first exemplary embodiment.

FIG. 7 shows a schematic diagram for describing the operation of the signal processing device 100 when the count value of the counter 151 is changed from "2" to "3". FIG. 7 shows a relation between the signal from the discrimination circuit 120 corresponding to the detection signal of the detection circuit 110 and the periods ΔT1 and ΔT2. In this case, the determination circuit 150 counts the rising edges of the detection signal for three times, outputs the trigger signal to the timer 140, and performs the count up of the counter 151. Although the determination circuit 150 may count the falling edge of the signal from the discrimination circuit 120, the determination circuit 150 counts the rising edge in this example. Note that, in this case, the desired signals A, B, and C, that are detection target by the signal processing device 100, are signals different from the ACK signal from the terminal and the transmission signal from the base station as described above.

As shown in FIG. 7, when the rising of the desired signal A from the detection circuit 110 is input at time t1, the trigger signal is output to the timer 130 from the determination circuit 150, and the period ΔT1 is started. The rising edges of the desired signals A, B, and C are counted for three times at the period ΔT1. When the rising edge of the desired signal C is detected at time t2, the count value of the counter 151 becomes "3". Accordingly, the counter 152 counts up at time t2, the trigger signal is output from the determination circuit 150 to the timer 140, and the period ΔT2 is started. At this period ΔT2, the timer 130 does not perform the timer operation. As such, even when the detection circuit 110 outputs the undesired signal D as the detection signal at time t3, the counter 151 does not perform the count up operation.

The period ΔT2 ends at time t4. At the same time, the trigger signal is output from the determination circuit 150 to the timer 130, and the period ΔT1 is started. At the period ΔT1, the rising edges of the desired signals A, B, C are counted, and the count value of the counter 151 becomes "3" at time t5. The similar operation is repeated in the following process.

From the above description, according to the signal processing device 100 of the first exemplary embodiment, by changing the setting of the count value of the counter 151, it becomes possible to determine the characteristics of the various reception signals, discriminate the undesired signal, and to extract only the desired signal with accuracy. Note that the count value of the counter 151 can be set to any desired number.

Second Exemplary Embodiment

Figure 8:
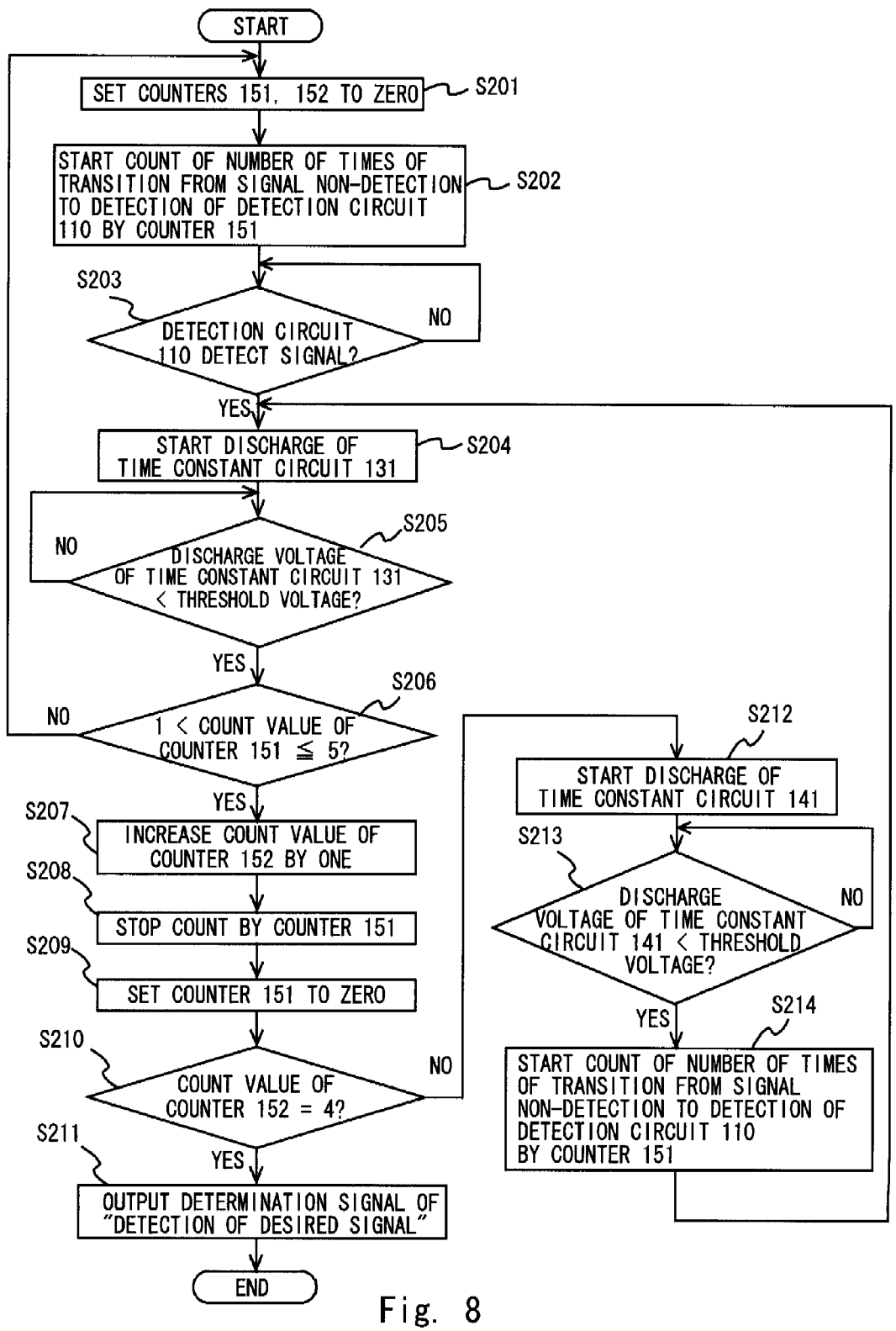
FIG. 8 shows a flow chart of the operation of a signal processing device according to a second exemplary embodiment.

The specific second exemplary embodiment to which the present invention is applied will be described hereinafter in detail with reference to the drawings. FIG. 8 shows a flow chart of the operation of a signal processing device 200 according to the second exemplary embodiment. In the second exemplary embodiment, the operation of the determination circuit 150 is different from that of the first exemplary embodiment. Referring to the flow chart of FIG. 8, the operation of the signal processing device 200 including this point will be described. Since the configuration of the signal processing device 200 is the same as that of FIG. 1, the description will be omitted.

First, the count values of the counters 151 and 152 are reset to zero (S201). Then, the counter 151 counts the number of times of transition (number of times of rising edges) from "no-signal-detection-state" to "signal-detection-state" of the detection circuit 110 (S202).

Then, it is monitored whether the detection circuit 110 detects the signal (S203). Upon detection of the signal by the detection circuit 110 (Yes in S203), the discharge operation of the time constant circuit 131 is started (S204). When the detection circuit 110 does not detect the signal (No in S203), the operation goes back to S203 to continue the monitoring operation.

When the discharge voltage of the time constant circuit 131 is the predetermined threshold voltage or more (No in S205), the operation goes back to S205. In summary, the operation of the timer 130 (discharge operation of the time constant circuit 131) is continued for the period $\Delta T1$.

When the discharge voltage of the time constant circuit 131 is less than the predetermined threshold voltage (Yes in S205), the determination circuit 150 determines whether the count value of the counter 151 is more than one and five or less (S206). When the count value of the counter 151 is not more than one and five or less (No in S206), it is determined that the desired signal has not been detected, and the state goes back to the initial state (S201). When the count value of the counter 151 is more than one and five or less (Yes in S206), the count value of the counter 152 is increased by one (S207), the count operation by the counter 151 is stopped (S208), and the counter 151 is reset to zero (S209).

When the count value of the counter 152 is four (Yes in S210), it is determined that the desired signal has been detected, and the high-level determination signal is output (S211). When the count value of the counter 152 is not four (No in S210), the discharge operation of the time constant circuit 141 is started (S212). When the discharge voltage of the time constant circuit 141 is less than the predetermined threshold voltage (Yes in S213), the counter 151 starts the count of the number of times of transition from the "no-signal-detection-state" to the "signal-detection-state" of the detection circuit 110 (S214), and the operation goes back to S204. When the discharge voltage of the time constant circuit 141 is the predetermined threshold voltage or more (No in S213), the operation goes back to S213. In summary, the timer operation of the timer 140 (discharge operation of the time constant circuit 141) is continued for the period $\Delta T2$.

Described above is the flow chart of the operation of the signal processing device 200 according to the second exemplary embodiment. The flow chart of the second exemplary embodiment is different from the flow chart of the operation of the first exemplary embodiment shown in FIG. 4 in that the determination circuit 150 checks the count value of the counter 151 after completion of the discharge operation of the time constant circuit (period $\Delta T1$), and that it is determined whether the count value of the counter 151 is within the certain range: more than one and five or less. In order to describe the operation of the signal processing device 200, FIG. 9 shows the relation between the signal from the discrimination circuit 120 corresponding to the detection signal of the detection circuit 110 and the timer operation period $\Delta T1$ of the timer 130 and the timer operation period $\Delta T2$ of the timer 140.

Figure 9:
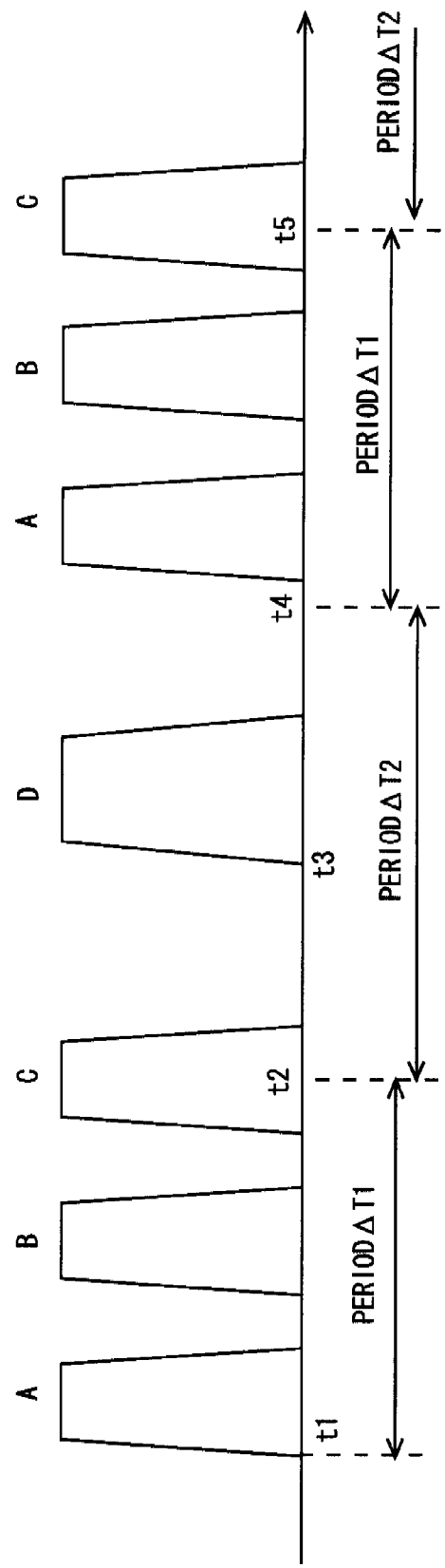
FIG. 9 shows a schematic diagram for describing the operation of the signal processing device according to the second exemplary embodiment.

As shown in FIG. 9, when the rising of the desired signal A from the detection circuit 110 is input at time t1, the trigger signal is output to the timer 130 from the determination circuit 150, and the period $\Delta T1$ is started. The rising edges of the desired signals A, B, and C are counted for three times in the period $\Delta T1$.

When the timer operation period $\Delta T1$ by the timer 130 ends at time t2, the counter 152 counts up as the count value of the counter 151 is "3", and the period $\Delta T2$ is further started. During the period $\Delta T2$, the timer 130 does not perform the timer operation. Accordingly, even when the detection circuit 110 outputs the undesired signal D as the detection signal at time t3, the counter 151 does not perform the count up operation.

At time t4, the period $\Delta T2$ ends. At the same time, the trigger signal is output from the determination circuit 150 to the timer 130, and the period $\Delta T1$ is started. At the period $\Delta T1$, the rising edges of the desired signals A, B, C are counted, and the count value of the counter 151 becomes "3" at time t5. The similar operation is repeated in the following process.

When the desired signal measured in the period $\Delta T1$ is "1" or smaller or more than "5", it is determined that the signal is the undesired signal.

As described above, according to the signal processing device 200 of the second exemplary embodiment, the operation of determining the signal as the undesired signal is realized even when the average burst frequency of the input desired signal is too high or too low.

Third Exemplary Embodiment

Figure 10:
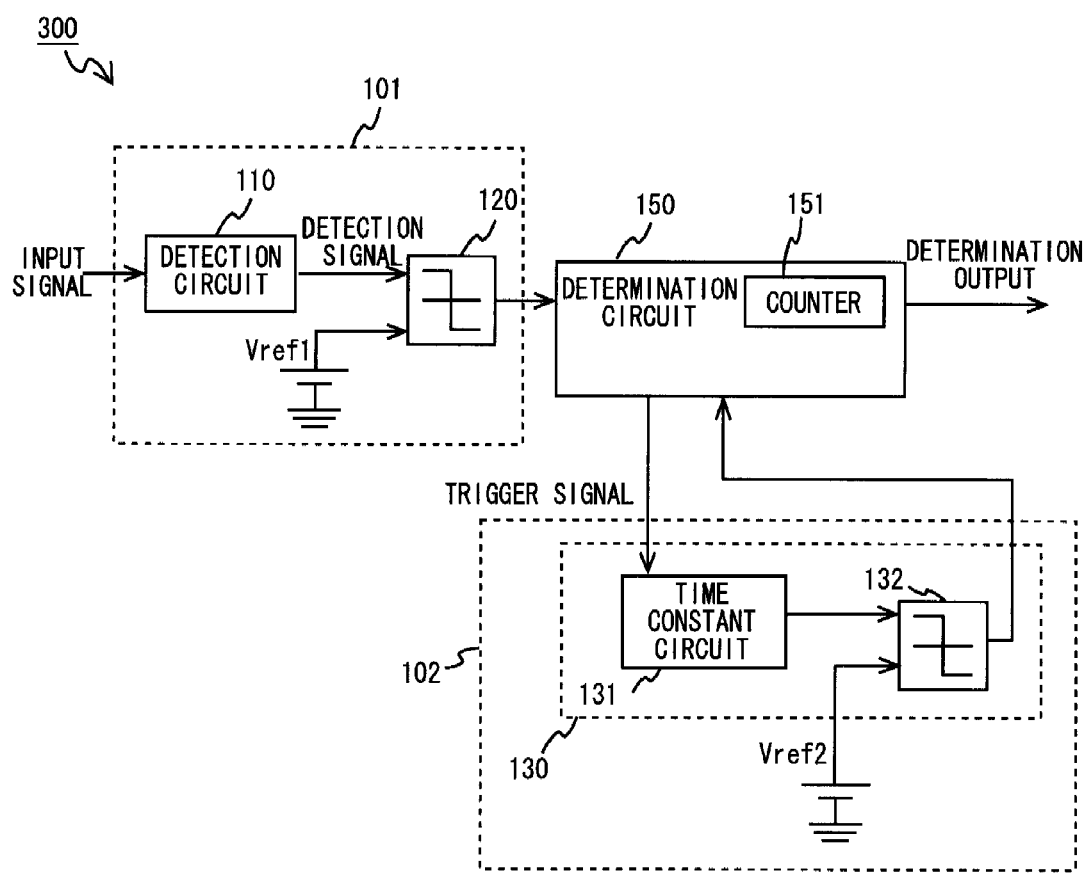
FIG. 10 shows a configuration of a signal processing device according to a third exemplary embodiment.

The specific third exemplary embodiment to which the present invention is applied will be described hereinafter in detail with reference to the drawings. FIG. 10 shows a configuration of a signal processing device 300 according to the third exemplary embodiment. The third exemplary embodiment is different from the first and second exemplary embodiments in that only one timer is employed instead of two.

As shown in FIG. 10, the configuration of the signal processing device 300 is substantially the same as that of the first exemplary embodiment except the determination circuit 150; and thus, the description other than the determination circuit 150 will be omitted.

The determination circuit 150 includes a counter 151. The counter 151 is controlled by the determination circuit 150, and performs the count up operation until the value reaches the predetermined count value. Further, when the value reaches the predetermined count value, the counter 151 stops the counting and set to zero.

Upon detecting the rising edge of the output signal from the discrimination circuit 120, the determination circuit 150 outputs the trigger signal to the timer 130 to start the timer operation. Then, the number of edges of the rising or falling edges of the output signal of the discrimination circuit 120 is counted during a time until when the signal of the timer 130 transits to high level, or during the period ΔT1. Further, when the count value of the counter 151 is within the predetermined range, for example "more than three and six or less" when the period ΔT1 ends, the high-level determination signal is output. When it is determined that the count value is within the predetermined range, "more than three and six or less", for example, the count operation is stopped and the counter is reset to zero.

As only one timer t is employed in the third exemplary embodiment, the operation of the determination circuit 150 is different from the first exemplary embodiment. The operation of the signal processing device 300 including this point will be described using a flow chart of the operation shown in FIG. 11.

Figure 11:
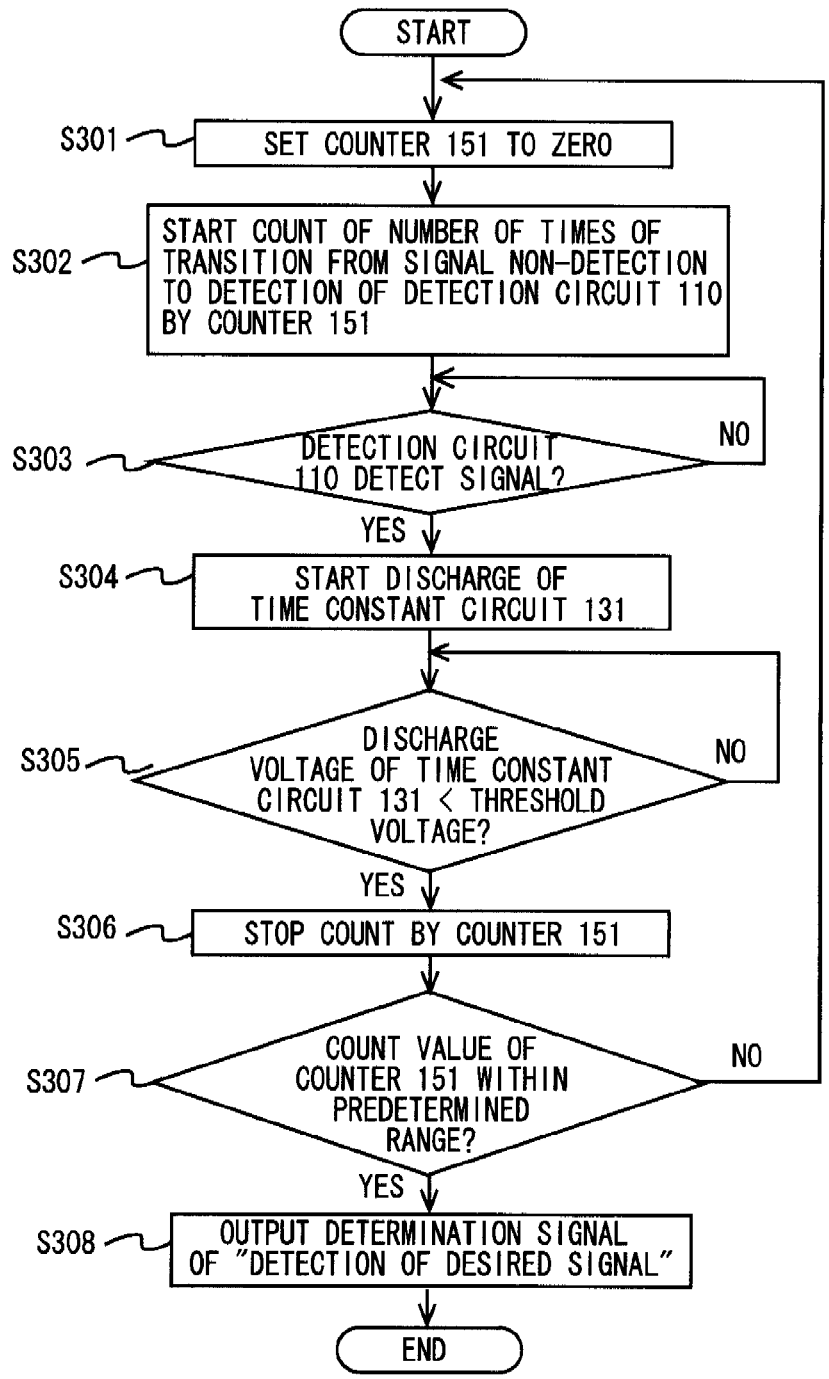
FIG. 11 shows a flow chart of the operation of the signal processing device according to the third exemplary embodiment.

FIG. 11 shows a flow chart of the operation of the signal processing device 300. First, the count value of the counter 151 is reset to zero (S301). Then, the counter 151 counts the number of times of transition from "no-signal-detection-state" to "signal-detection-state" of the detection circuit 110 (S302).

Then, it is monitored whether the detection circuit 110 detects the signal (S303). Upon detection of the signal by the detection circuit 110 (Yes in S303), the discharge operation of the time constant circuit 131 is started (S304). When the detection circuit 110 does not detect the signal (No in S303), the operation goes back to S303 to continue the monitoring operation.

When the discharge voltage of the time constant circuit 131 is the predetermined threshold voltage or more (No in S305), the operation goes back to S305. In summary, the timer operation of the timer 130 (discharge operation of the time constant circuit 131) is continued for the period ΔT1.

When the discharge voltage of the time constant circuit 131 is less than the predetermined threshold voltage (Yes in S305), the count operation of the counter 151 is stopped (S306). The determination circuit 150 determines whether the count value of the counter 151 is within the predetermined range (S307). When the count value is within the predetermined range (Yes in S307), it is determined that the desired signal has been detected, and the high-level determination signal is output (S308). When the count value is not within the predetermined range (No in S307), it is determined that the desired signal has not been detected, and the operation goes back to the initial state (S301).

Figure 12:
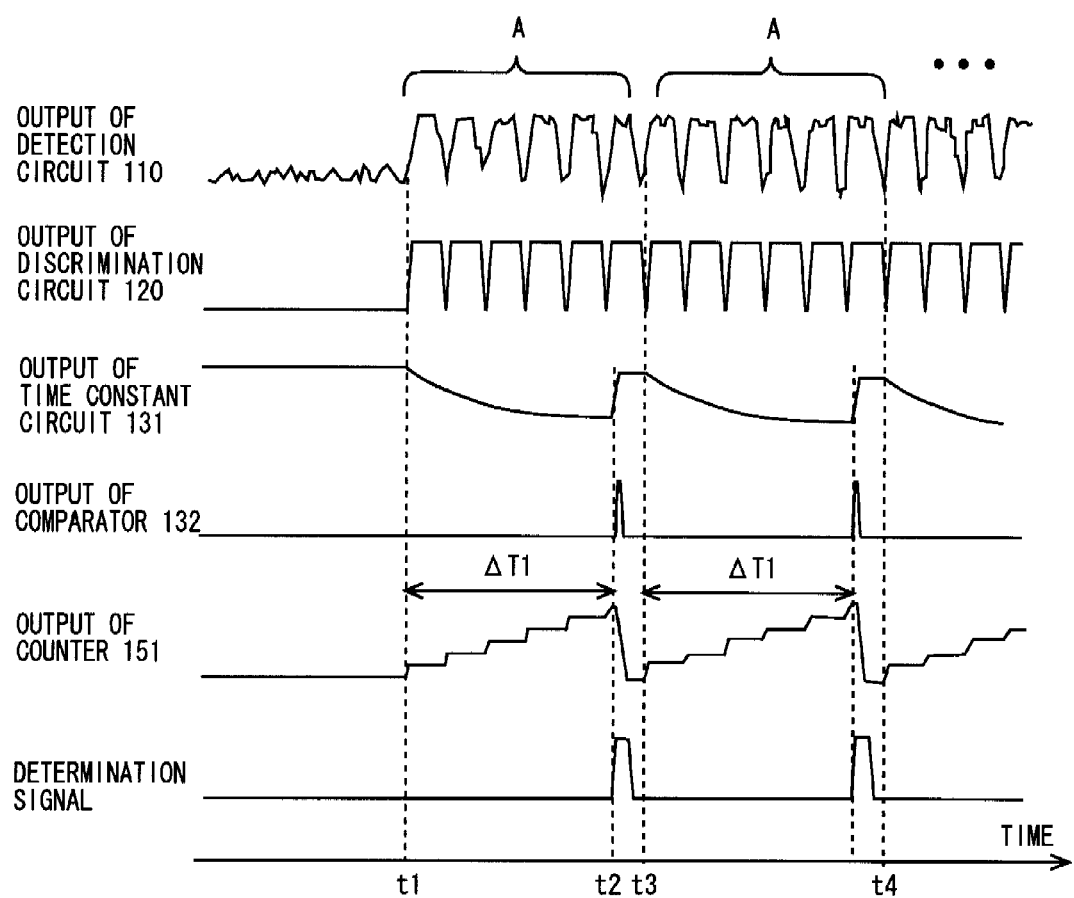
FIG. 12 shows a timing chart of the operation of the signal processing device according to the third exemplary embodiment.

FIG. 12 shows one example of a timing chart of the operation of the signal processing device 300. Note that it is assumed that only the desired signal is input to the detection circuit 110 in this example. Further, it is assumed that the determination circuit 150 counts the rising edge of the output signal of the detection circuit 110 passing through the discrimination circuit 120. Further, it is assumed that the determination circuit 150 outputs the high-level determination signal when the count value of the counter 151 is "more than three and six or less".

First, the transmission signal from the base station is input to the detection circuit 110 at time t1, and the signal A is output as the detection output. Accordingly, the high-level signal corresponding to the signal A is raised from the discrimination circuit 120. Further, the trigger signal in accordance with the rising edge of this signal is output from the determination circuit 150 to the timer 130. Then, the discharge operation of the time constant circuit 131 is started, and the output voltage of the time constant circuit 131 starts to decrease. When the output voltage of the time constant circuit 131 decreases to a predetermined voltage, the output voltage of the comparator 132 is raised to high level. Here, "predetermined voltage" is pre-selected in a way that the time from when the time constant circuit 131 starts the discharge operation to when the output voltage of the comparator 132 is raised to the high level becomes ΔT1. The counter 151 of the determination circuit 150 counts rising edges of the output signal of the discrimination circuit 120 in the period ΔT1, which is the time from when the trigger signal is sent to the timer 130 by the determination circuit 150 to when the output voltage of the comparator 132 is raised to the high level.

At time t2, the period ΔT1 ends, where the discharge voltage of the time constant circuit 131 is less than the predetermined threshold voltage. Then, the output voltage of the comparator 132 is raised to high level, and in synchronization with it, the count value of the counter 151 of the determination circuit 150 is within the predetermined range, "6", in this example, and the high-level determination signal is output from the determination circuit 150. In the operation example of FIG. 12, after a series of determination conditions are satisfied and the determination signal of the desired signal detection is raised to high level, the operation is not completed. Instead of completing the operation, the operation is started again from the initial state. In summary, the similar operations are performed from the initial state at time t3 or time t4.

Figure 13:
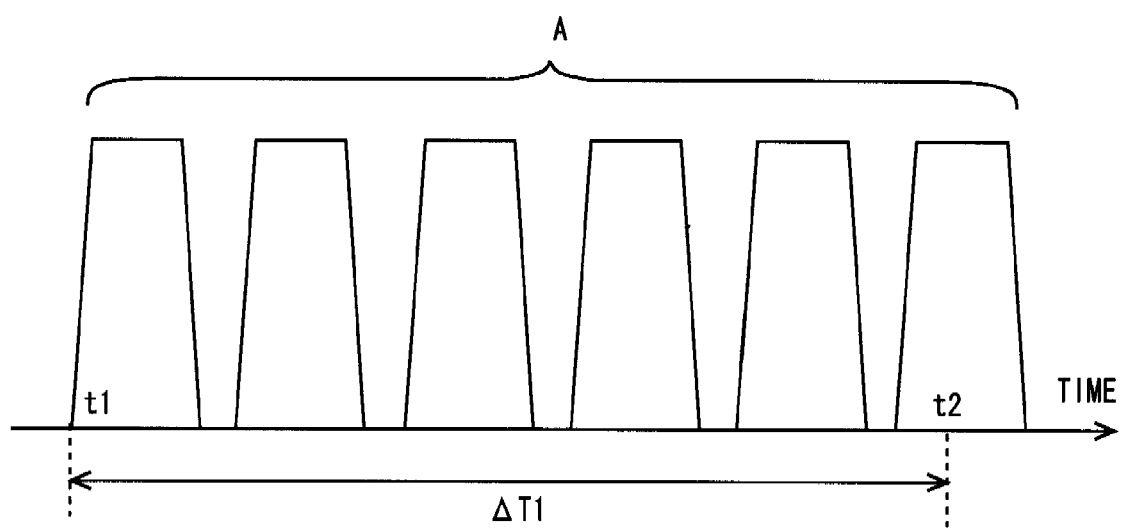
FIG. 13 shows a schematic diagram for describing the operation of the signal processing device according to the third exemplary embodiment.

FIG. 13 shows a schematic diagram for describing the operation of the signal processing device 300. FIG. 13 shows the relation between the signal from the discrimination circuit 120 corresponding to the detection signal of the detection circuit 110 and the timer operation period ΔT1 of the timer 130 (discharge period of the time constant circuit 131). As shown in FIG. 13, when the first rising of the desired signal A from the detection circuit 110 is input at time t1, the trigger signal is output from the determination circuit 150 to the timer 130, and the period ΔT1 is started. At the period ΔT1, the rising edge of the desired signal A is input for six times from the detection circuit 110 to the determination circuit 150, and the counter 151 counts it. When the count operation period ΔT1 by the timer 130 is completed at time t2, the count value of the counter 151 becomes "6". As this value satisfies "more than three and six or less", the high-level determination signal is output from the determination circuit 150. It is determined that the signal is the undesired signal and the high-level determination signal is not output when the desired signal A measured in the period ΔT1 is "two or less, or more than seven".

As described above, the signal processing device 300 according to the third exemplary embodiment starts the timer operation of the timer 130 upon the rising edge of the output of the detection circuit 110, and determines the number of rising or falling edges of the output of the detection circuit 110 when the timer operation is completed, so as to determine whether the signal is the desired signal. Accordingly, it is possible to selectively detect the signal whose average burst frequency is within the certain range.

In the configuration diagram shown in FIG. 10, a comparator that compares a voltage with the reference voltages Vref1, Vref2 is employed as the comparator 132 and the discrimination circuit 120. However, the comparator may be the one that does not compare the voltage with the reference voltage.

Figure 14:
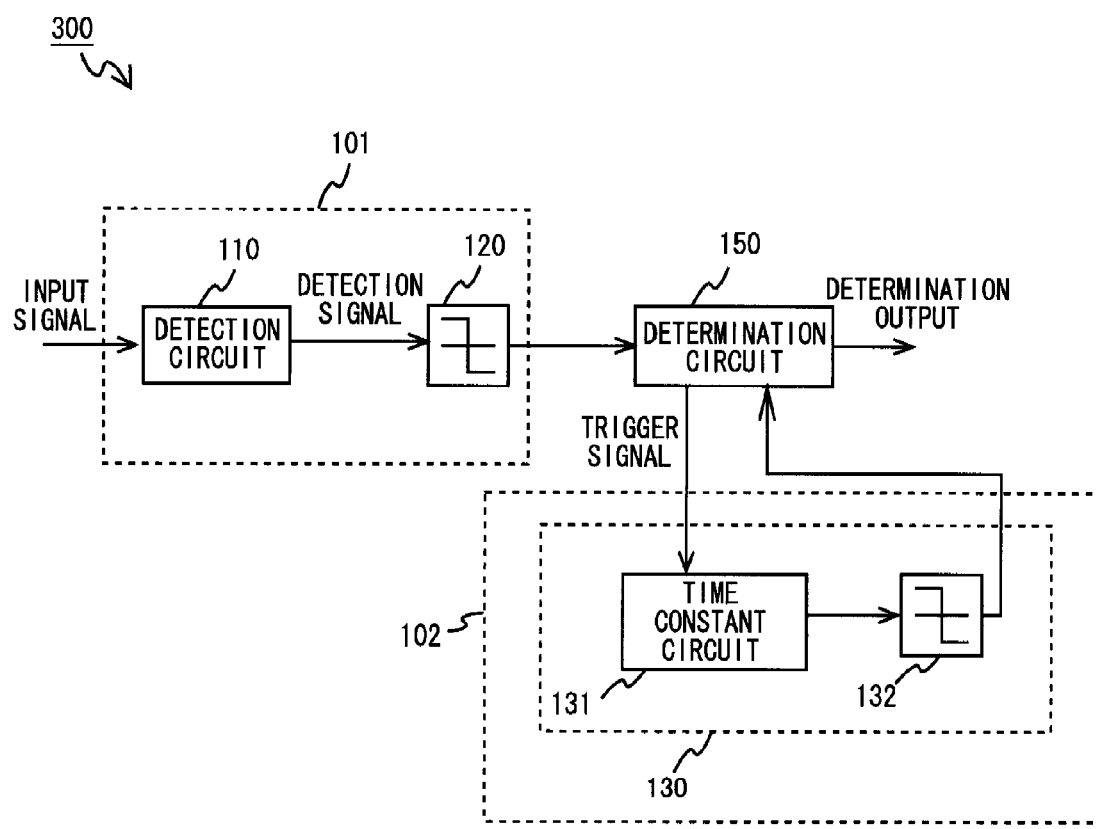
FIG. 14 shows a configuration of the signal processing device according to the third exemplary embodiment.
Figure 15A:
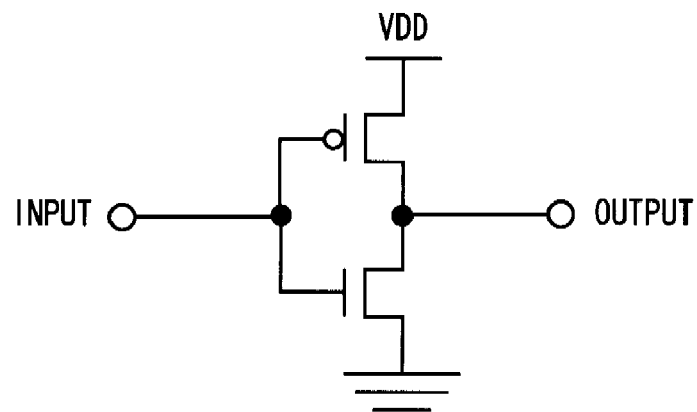
FIG. 15A shows a configuration of a comparator according to the third exemplary embodiment.
Figure 15B:
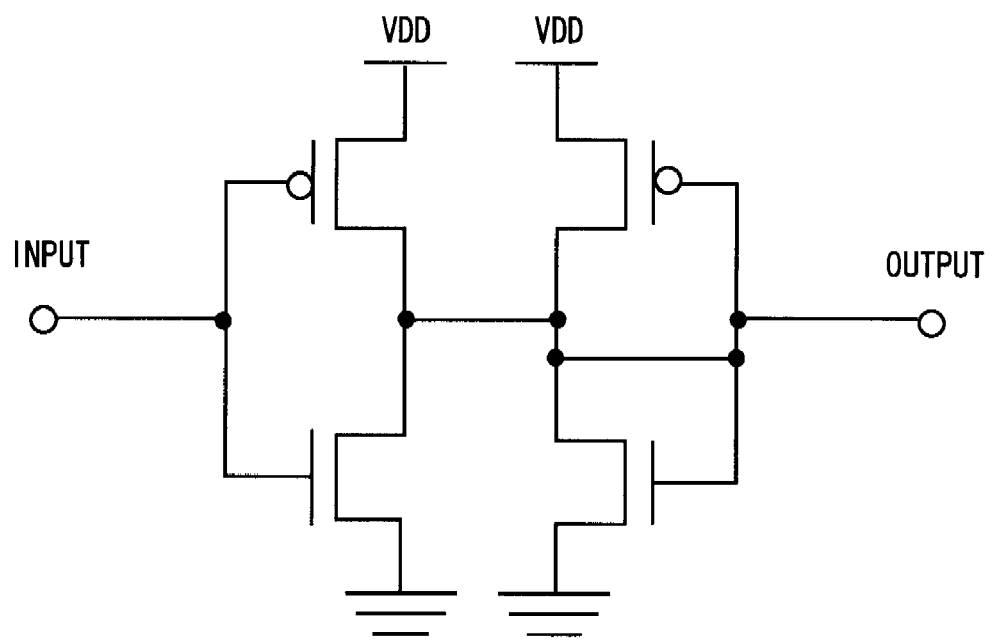
FIG. 15B shows a configuration of the comparator according to the third exemplary embodiment.

In this case, the configuration of the signal processing device 300 is as shown in FIG. 14. The specific circuit of the comparator includes a CMOS inverter as shown in FIG. 15A or a Schmitt trigger circuit as shown in FIG. 15B or the like. The circuits shown in FIGS. 15A and 15B are generally known, and accordingly, the description of the configuration and the operation will be omitted. The configuration of the comparator can be applied to the first and second exemplary embodiments shown in FIG. 1 or exemplary embodiments described below.

Fourth Exemplary Embodiment

Figure 16:
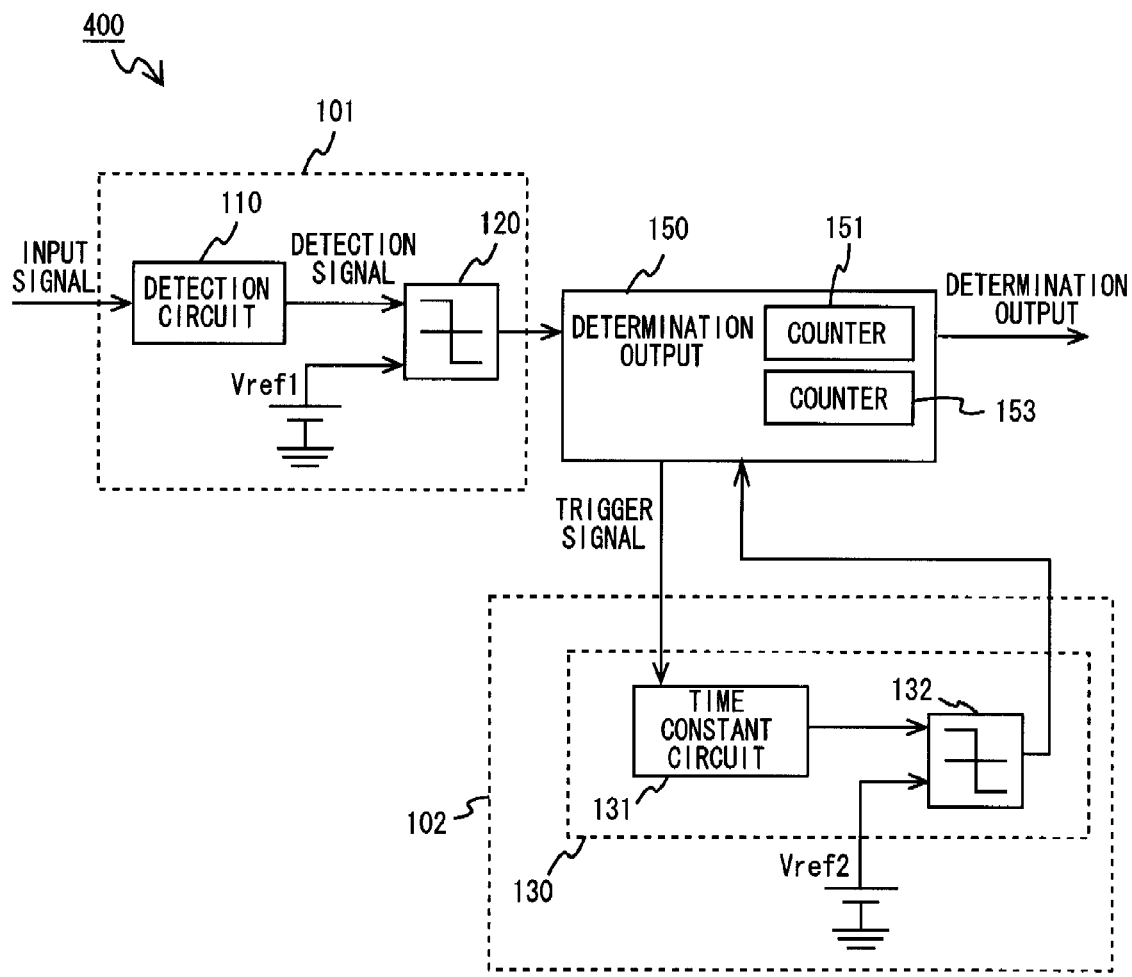
FIG. 16 shows a configuration of a signal processing device according to a fourth exemplary embodiment.

The specific fourth exemplary embodiment to which the present invention is applied will be described hereinafter in detail with reference to the drawings. FIG. 16 shows a configuration of a signal processing device 400 according to the fourth exemplary embodiment. The fourth exemplary embodiment is different from the third exemplary embodiment in that the determination circuit 150 further includes a counter 153. Referring to a flow chart of FIG. 17, the operation of the signal processing device 400 including this point will be described.

The determination circuit 150 includes counters 151 and 153. The counter 153 performs the count up operation when the value counted by the counter 151 is within the predetermined range, "within three to six", for example, in the operation period ΔT1 of the timer 130 (discharge period of the time constant circuit 131). Then, the counter 153 outputs the high-level signal when the count value reaches the predetermined value, "4", for example. As the counter 151 performs substantially the similar operation as that of the third exemplary embodiment, the description will be omitted.

Figure 17:
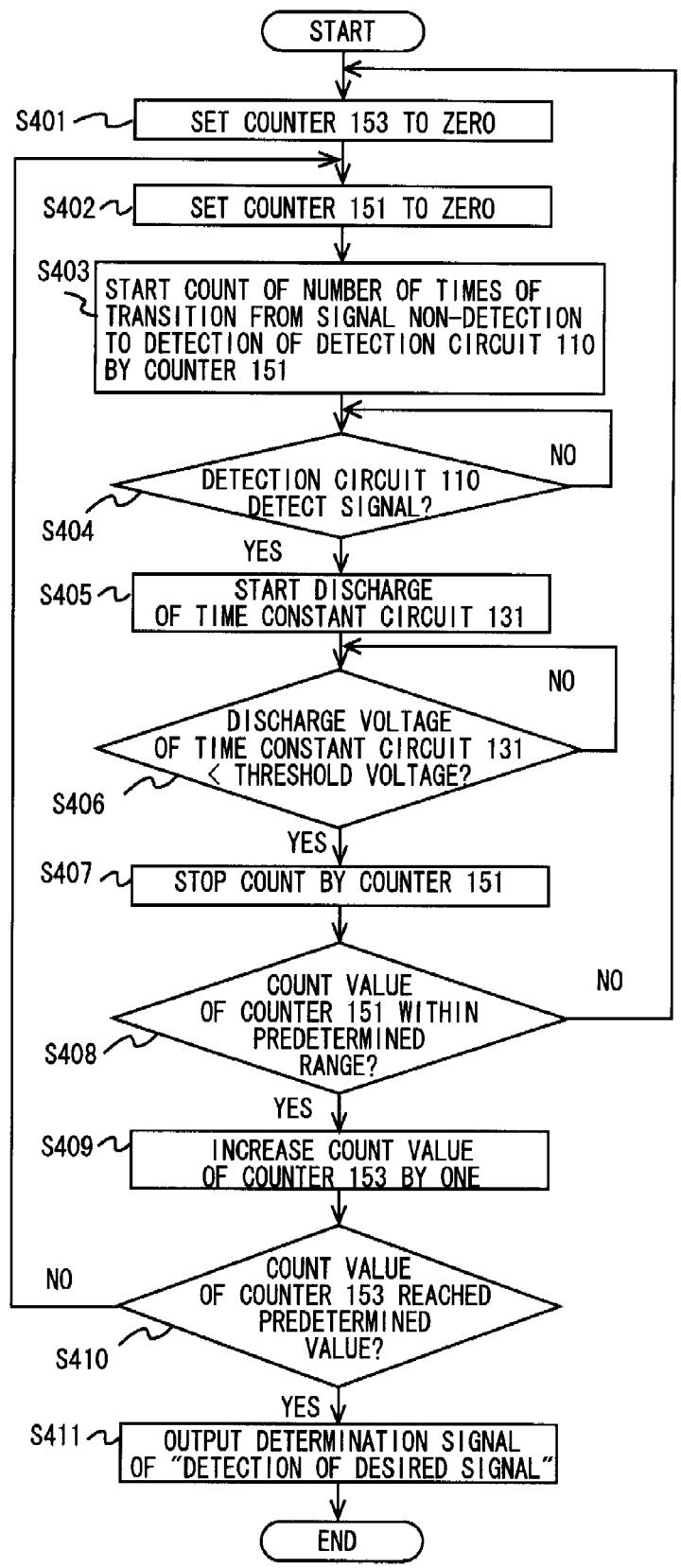
FIG. 17 shows a flow chart of the operation of the signal processing device according to the fourth exemplary embodiment.

FIG. 17 shows a flow chart of the operation of the signal processing device 400. First, the count value of the counter 153 is reset to zero (S401). The count value of the counter 151 is reset to zero (S402). Then, the counter 151 starts the count of the number of times of transition from the "no-signal-detection-state" to the "signal-detection-state" of the detection circuit 110 (S403).

Then, it is monitored whether the detection circuit 110 detects the signal (S404). When it is determined that the detection circuit 110 detects the signal (Yes in S404), the discharge operation of the time constant circuit 131 is started (S405). When the detection circuit 110 does not detect the signal (No in S404), the operation goes back to S404, and the monitoring operation is continued.

When the discharge voltage of the time constant circuit 131 is the predetermined threshold voltage or more (No in S406), the operation goes back to S406. In summary, the timer operation of the timer 130 (discharge operation of the time constant circuit 131) is continued for the period ΔT1.

When the discharge voltage of the time constant circuit 131 is less than the predetermined threshold voltage (Yes in S406), the count operation of the counter 151 is stopped (S407). The determination circuit 150 determines whether the count value of the counter 151 is within the predetermined range (S408). When the count value is within the predetermined range (Yes in S408), the count value of the counter 153 is increased by "1" (S409). When the count value is not within the predetermined range (No in S408), the operation goes back to S401.

When the count value of the counter 153 reaches the predetermined value (Yes in S410), it is determined that the desired signal has been detected, and the high-level determination signal is output (S411). When the count value of the counter 153 has not reached the predetermined value (No in S410), the operation goes back to S402.

As described above, the signal processing device 400 according to the fourth exemplary embodiment determines that the desired signal has been detected when the desired signal detection condition of the third exemplary embodiment is repeated continuously until when the count value of the counter 153 reaches the predetermined value.

Fifth Exemplary Embodiment

Figure 18:
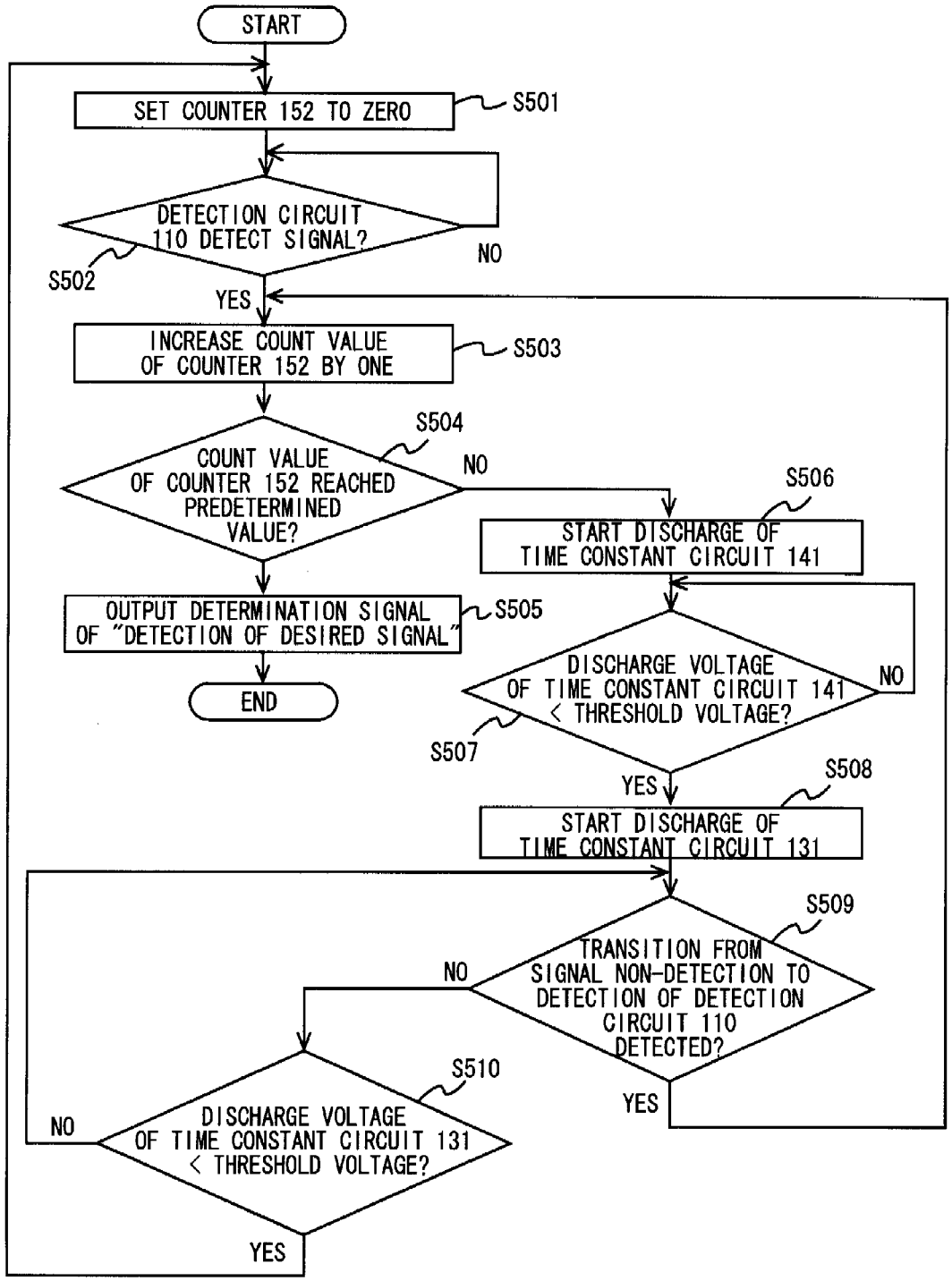
FIG. 18 shows a flow chart of the operation of a signal processing device according to a fifth exemplary embodiment.

The specific fifth exemplary embodiment to which the present invention is applied will be described hereinafter in detail with reference to the drawings. FIG. 18 shows a flow chart of the operation of a signal processing device 500 according to the fifth exemplary embodiment. The fifth exemplary embodiment executes the operation similar to the operation flow chart of the first exemplary embodiment in FIG. 4 except in that the part of the condition determination of "count value of counter 151 "2"?" is replaced with "count value of counter 151 "1"?". As a result of eliminating the redundant part of the flow chart due to this replacement, the operation of the counter 151 is eliminated.

Substantially, the condition determination part of "detection circuit detect signal?" in the flow chart in FIG. 18 includes two operations of "increase count value of counter 151 from "0" to "1"", "go to next processing as condition that count value of counter 151 is "1" is satisfied".

Figure 19:
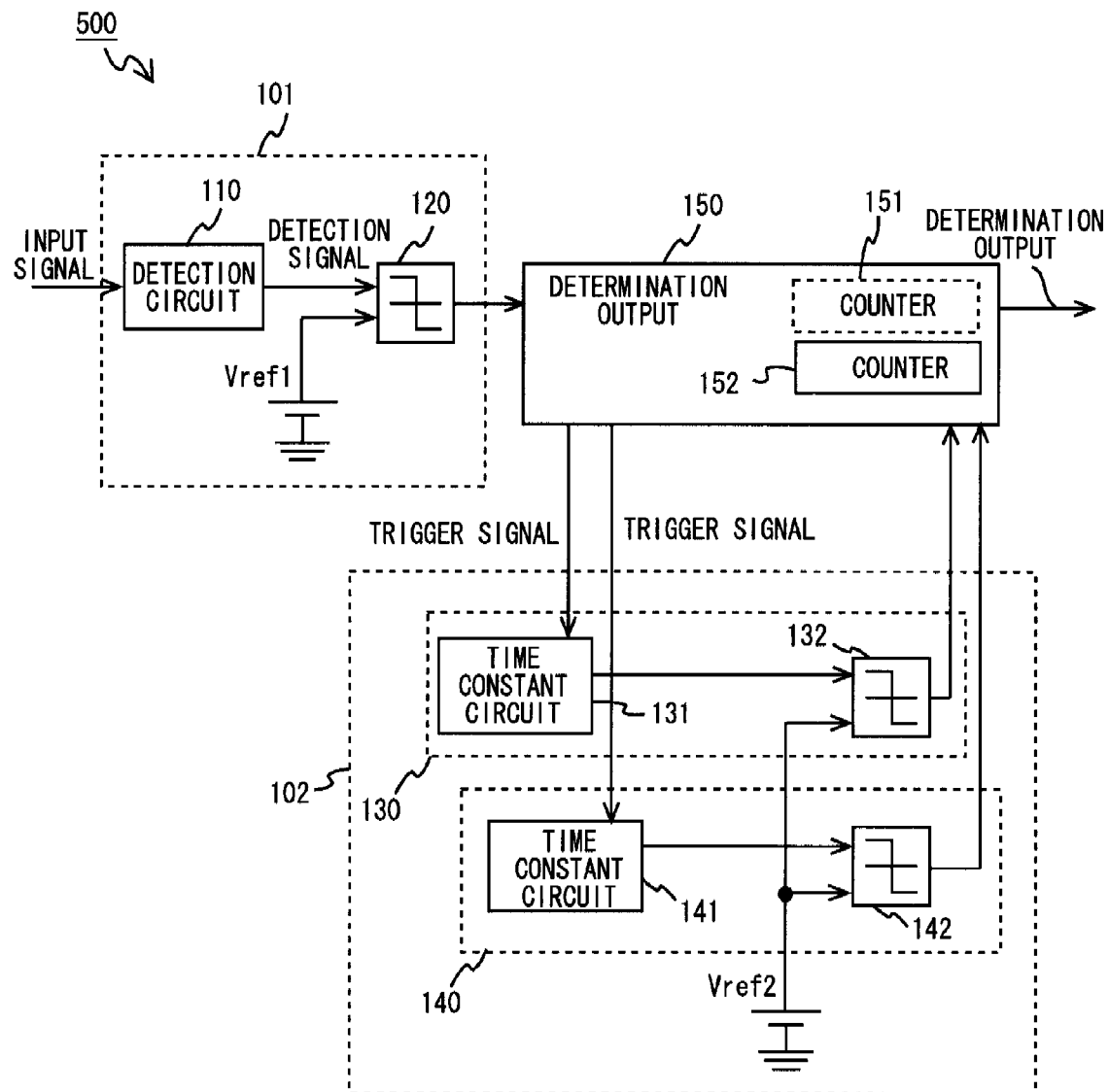
FIG. 19 shows a configuration of the signal processing device according to the fifth exemplary embodiment.

Accordingly, the configuration of the signal processing device 500 is as shown in FIG. 19. As described above, the counter 151 of the determination circuit 150 has a count value of "1" at the time when the rising of the output signal from the discrimination circuit 120 is detected. Thus, the determination circuit 150 immediately outputs the trigger signal to the timer 140 to start the timer operation. In summary, the operation of the output or the like of the trigger signal can be started as long as the determination circuit 150 is able to detect the rising of the output signal from the discrimination circuit 120 even though the count operation of the counter 151 is not performed. Thus, the configuration here is the same as the determination circuit 150 shown in FIG. 1 except for the absence of the counter 151. However, it does not mean that the counter 151 needs to be removed from the determination circuit 150, but the counter 151 may be ignored.

Since other configuration is the same as that of FIG. 1, the description will be omitted. Further, as the operation of the determination circuit 150 in the fifth exemplary embodiment is different from that in the first exemplary embodiment, explanation will be made on the operation of the signal processing device 500 including this point with reference to the flow chart of FIG. 18.

FIG. 18 shows a flow chart of the operation of the signal processing device 500. First, the count value of the counter 152 is reset to zero (S501). Then, it is monitored whether the detection circuit 110 detects the signal (S502). When the detection circuit 110 detects the signal (Yes in S502), the count value of the counter 152 is increased by one (S503). When the detection circuit 110 does not detect the signal (No in S502), the operation goes back to S502 to continue the monitoring operation.

Next, the determination circuit 150 determines whether the count value of the counter 152 has reached the predetermined value (S504). When the count value has reached the predetermined value (Yes in S504), it is determined that the desired signal has been detected, and the high-level determination signal is output (S505). When the count value has not reached the predetermined value (No in S504), the discharge operation of the time constant circuit 141 is started (S506).

When the discharge voltage of the time constant circuit 141 is the predetermined threshold voltage or more (No in S507), the operation goes back to S507. In other words, the timer operation of the timer 140 (discharge operation of the time constant circuit 141) is continued for the period ΔT2. When the discharge voltage of the time constant circuit 141 is lower than the predetermined threshold voltage (Yes in S507), the discharge of the time constant circuit 131 is started (S508).

Next, when the determination circuit 150 detects the state transition from the "no-signal-detection-state" to the "signal-detection-state" of the detection circuit 110 (Yes in S509), the operation goes back to S503.

When the state transition from the "no-signal-detection-state" to the "signal-detection-state" of the detection circuit 110 is not detected (No in S509), and the discharge voltage of the time constant circuit 131 is the predetermined threshold voltage or more (No in S510), the operation goes back to S509. In other words, it is determined by the determination circuit 150 whether the detection circuit 110 detects the signal during the period ΔT1 (timer operation period of the timer 130).

When the state transition from the "no-signal-detection-state" to the "no-signal-detection-state" of the detection circuit 110 is not detected (No in S509), and the discharge voltage of the time constant circuit 131 is lower than the predetermined threshold voltage (Yes in S510), the operation goes back to the initial state (S501). In summary, it is determined by the determination circuit 150 that the detection circuit 110 has not detected the signal during the period ΔT1 (timer operation period of the timer 130), and the operation goes back to the initial state.

In the signal processing device 500 according to the fifth exemplary embodiment, when the rising of the detection signal is repeated in substantially the certain time intervals, and the interval is longer than the time constant ΔT2 of the time constant circuit 141 (timer operation period of the timer 140) and shorter than the time constant ΔT1+time constant ΔT2, the input signal is detected as a desired signal.

Sixth Exemplary Embodiment

Figure 20:
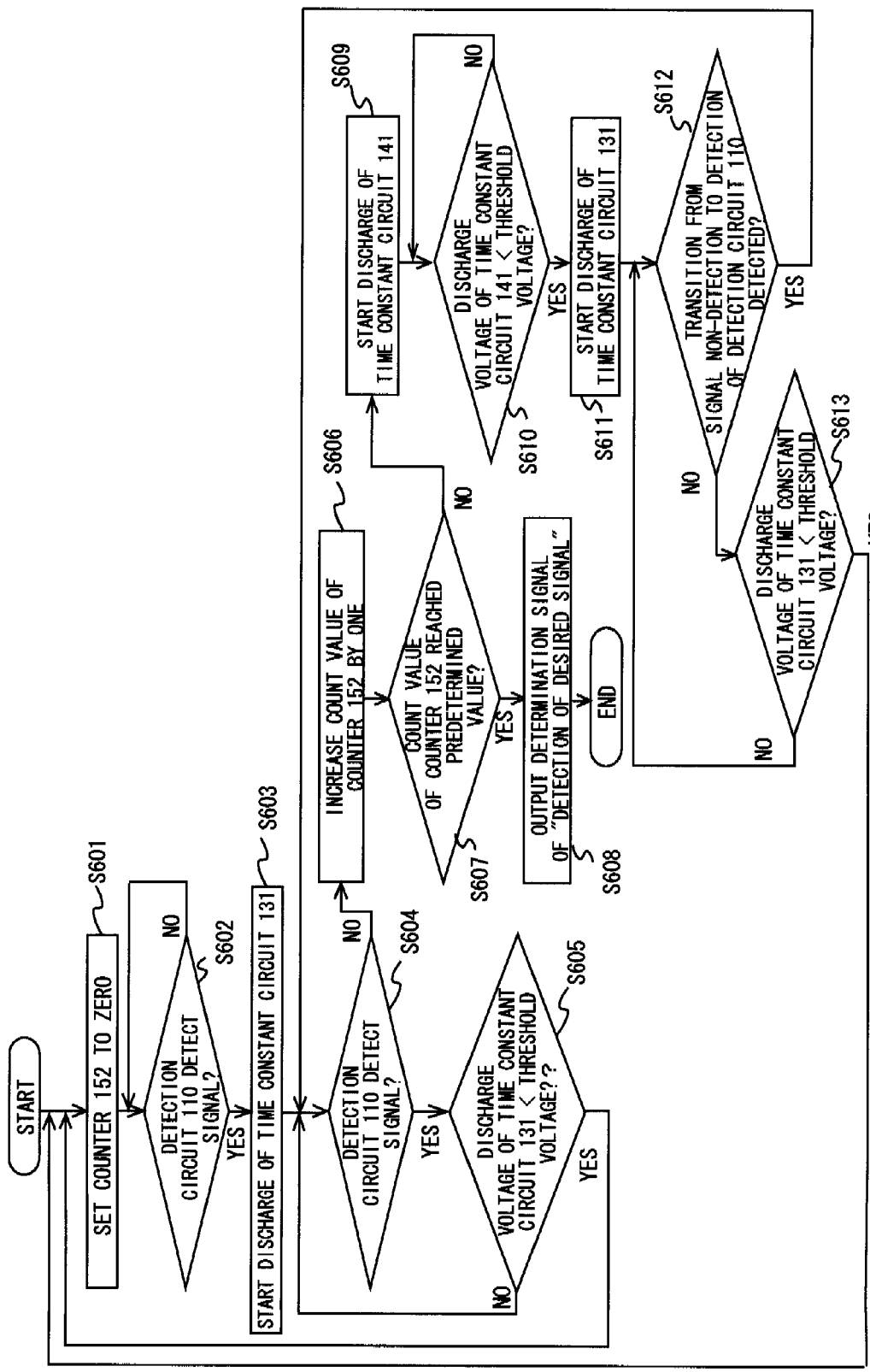
FIG. 20 shows a flow chart of the operation of a signal processing device according to a sixth exemplary embodiment.

The specific sixth exemplary embodiment to which the present invention is applied will be described hereinafter in detail with reference to the drawings. FIG. 20 shows a flow chart of the operation of a signal processing device 600 according to the sixth exemplary embodiment. Since the configuration of the signal processing device 600 may ignore the operation of the counter 151 as in the fifth exemplary embodiment, the configuration is the same as shown in FIG. 19. The operation of the determination circuit 150 in the sixth exemplary embodiment is different from that in the fifth exemplary embodiment. Referring to the flow chart of the operation of FIG. 20, the operation of the signal processing device 600 including this point will be described.

First, the count value of the counter 152 is reset to zero (S601). Then, it is monitored whether the detection circuit 110 detects the signal (S602). When the detection circuit 110 detects the signal and the detection signal is raised (Yes in S602), the discharge operation of the time constant circuit 131 is started (S603). When the detection circuit 110 does not detect the signal and the detection signal is not raised (No in S602), the operation goes back to S602, and the monitoring operation is continued.

Next, when the detection circuit 110 continues to detect the signal and the detection signal is not fallen (Yes in S604), and the discharge voltage of the time constant circuit 131 is the predetermined threshold voltage or more (No in S605), the operation goes back to S604. In other words, it is determined by the determination circuit 150 whether the falling of the detection signal is detected during the period ΔT1 (timer operation period of the timer 130). When the detection circuit 110 continues to detect the signal and the detection signal is not fallen (Yes in S604), and the discharge voltage of the time constant circuit 131 is lower than the predetermined threshold voltage (Yes in S605), the operation goes back to the initial state (S601). In summary, it is determined by the determination circuit 150 that the falling of the detection signal has not been detected during the period ΔT1 (timer operation period of the timer 130).

On the other hand, when the falling of the detection signal has been detected (No in S604), the count value of the counter 152 is increased by one (S606). Next, when the count value of the counter 152 has reached the predetermined value (Yes in S607), it is determined that the desired signal has been detected, and the high-level determination signal is output (S608). When the count value of the counter 152 has not reached the predetermined value (No in S607), the discharge operation of the time constant circuit 141 is started (S609).

When the discharge voltage of the time constant circuit 141 is the predetermined threshold voltage or more (No in S610), the operation goes back to S610, and the discharge operation of the time constant circuit 141 is continued for the period ΔT2 of the time constant. In other words, the timer operation of the timer 140 is continued for the period ΔT2. When the discharge voltage of the time constant circuit 141 is lower than the predetermined threshold voltage (Yes in S610), the discharge of the time constant circuit 131 is started (S611).

Next, when the determination circuit 150 detects the state transition from the "no-signal-detection-state" to the "signal-detection-state" of the detection circuit 110 (Yes in S612), the operation goes back to S604. In other words, when the rising of the detection signal is detected in the discharge operation period ΔT1 of the time constant circuit 131 (timer operation period of the timer 130), the operation is moved to the operation for waiting for the detection of the falling of the detection signal.

When the state transition from the "no-signal-detection-state" to the "signal-detection-state" of the detection circuit 110 has not been detected (No in S612), and the discharge voltage of the time constant circuit 131 is the predetermined threshold voltage or more (No in S613), the operation goes back to S612. In other words, the determination circuit 150 determines whether the rising of the detection signal is detected in the period ΔT1. When the state transition from the "no-signal-detection-state" to the "signal-detection-state" of the detection circuit 110 has not been detected (No in S612), and the discharge voltage of the time constant circuit 131 is lower than the predetermined threshold voltage (Yes in S613), the operation goes back to the initial operation (S601). In summary, the determination circuit 150 determines that the rising of the detection signal has not been detected in the period ΔT1, and the operation goes back to the initial state.

Figure 21:
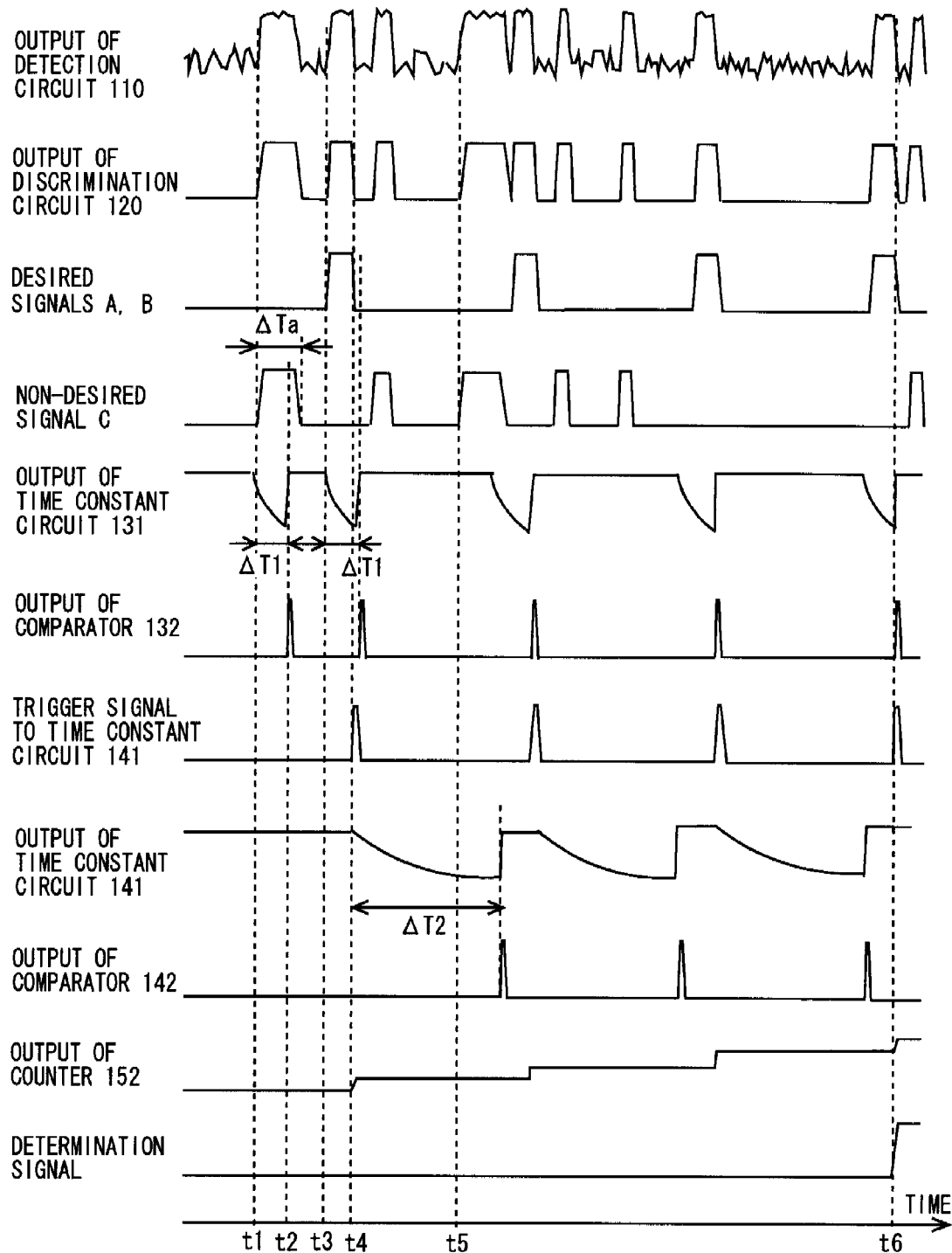
FIG. 21 shows a timing chart of the operation of the signal processing device according to the sixth exemplary embodiment.

FIG. 21 shows one example of the timing chart of the operation of the signal processing device 600. In this example, it is assumed that the desired signal A and the undesired signal B are input to the detection circuit 110. For easier comprehension of the operation of the signal processing device 600 in this example, FIG. 21 shows signal waveforms of the desired signal A and the undesired signal B among the output signals of the discrimination circuit 120.

At time t1 in FIG. 21, the undesired signal B is input to the detection circuit 110, and the high-level signal corresponding to the undesired signal B is raised from the discrimination circuit 120. In accordance with this, the discharge of the time constant circuit 131 is started, and the output voltage of the time constant circuit 131 starts to decrease. After the period ΔT1, the output voltage of the comparator 132 is raised to be high level.

At time t2, the discharge of the time constant circuit 131 (period ΔT1) ends, but the undesired signal B still keeps high level. The determination circuit 150 cannot detect the falling from the undesired signal B, and the count value of the counter 141 keeps "0".

At time t3, the desired signal A is input to the detection circuit 110, and the high-level signal corresponding to the desired signal A is raised from the discrimination circuit 120. In accordance with this, the discharge of the time constant circuit 131 is started, the output voltage of the time constant circuit 131 starts to decrease, and the count of the period ΔT1 is started again. As the desired signal A is fallen to the low level at time t4 in the period ΔT1, the count value of the counter 152 is increased by "1" in synchronization with this falling. Further, the trigger signal is send to the time constant circuit 141 from the determination circuit 150, and the discharge of the time constant circuit 141 is started in accordance with this. After the period ΔT2, the output voltage of the comparator 142 is raised. The discharge of the time constant circuit 131 is not started until when the period ΔT2 ends. Accordingly, even when the undesired signal B is input to the detection circuit 110 at time t5, for example, the determination circuit 150 does not detect the undesired signal B, and the counter 152 does not count up accordingly. The similar operation is repeated in the following process. When the falling of the desired signal A is detected at time t6, the determination circuit 150 determines that the count value of the counter 152 has reached the predetermined value: "4", for example, to output the high-level determination signal.

Figure 22:
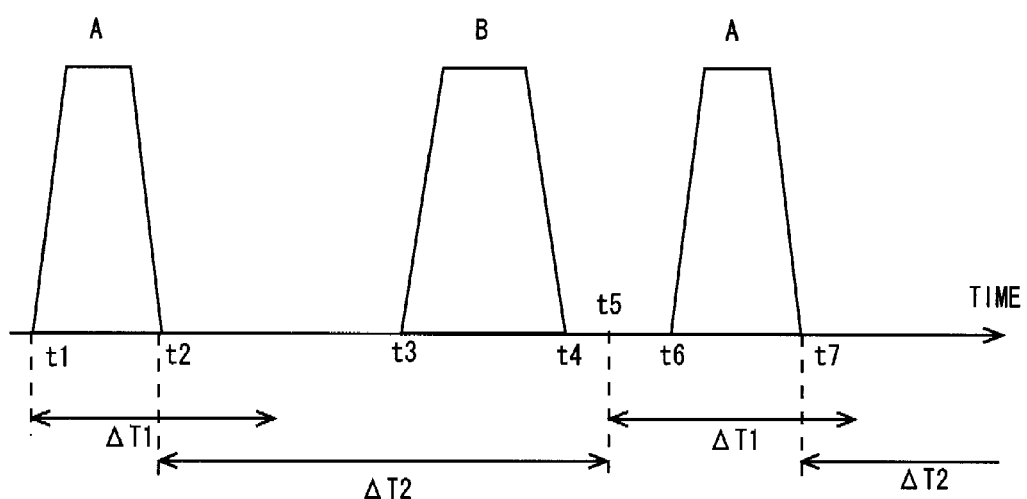
FIG. 22 shows a schematic diagram for describing the operation of the signal processing device according to the sixth exemplary embodiment.

FIG. 22 is a schematic diagram for describing the operation of the signal processing device 600. FIG. 22 shows a relation between the signal from the discrimination circuit 120 corresponding to the detection signal of the detection circuit 110 and the timer operation period ΔT1 of the timer 130 (discharge period of the time constant circuit 131) and the timer operation period ΔT2 of the timer 140 (discharge period of the time constant circuit 141). As shown in FIG. 22, the rising of the desired signal A is detected at time t1, and the period ΔT1 is started. When the falling of the desired signal A is detected at time t2 in the period ΔT1, the period ΔT2 is started. During the period ΔT2, the determination circuit 150 cannot detect the rising or falling of the output signal of the detection circuit 110. Accordingly, even when the undesired signal B is input at time t3, the determination circuit 150 cannot detect the rising or falling of the undesired signal B at time t3, t4, and there is no change in the count value of the counter 152.

At time t5, the period ΔT2 ends, and the period ΔT1 is started at the same time. At time t6, the rising of the desired signal A is detected. After that, at time t7, the falling is detected and the period ΔT2 is started. Then, the similar operation is repeated.

In the signal processing device 600 according to the sixth exemplary embodiment, when a burst signal which is shorter than the period ΔT1 is transmitted at the intervals of about the period ΔT2, the burst signal can be determined as the desired signal.

Seventh Exemplary Embodiment

Figure 23:
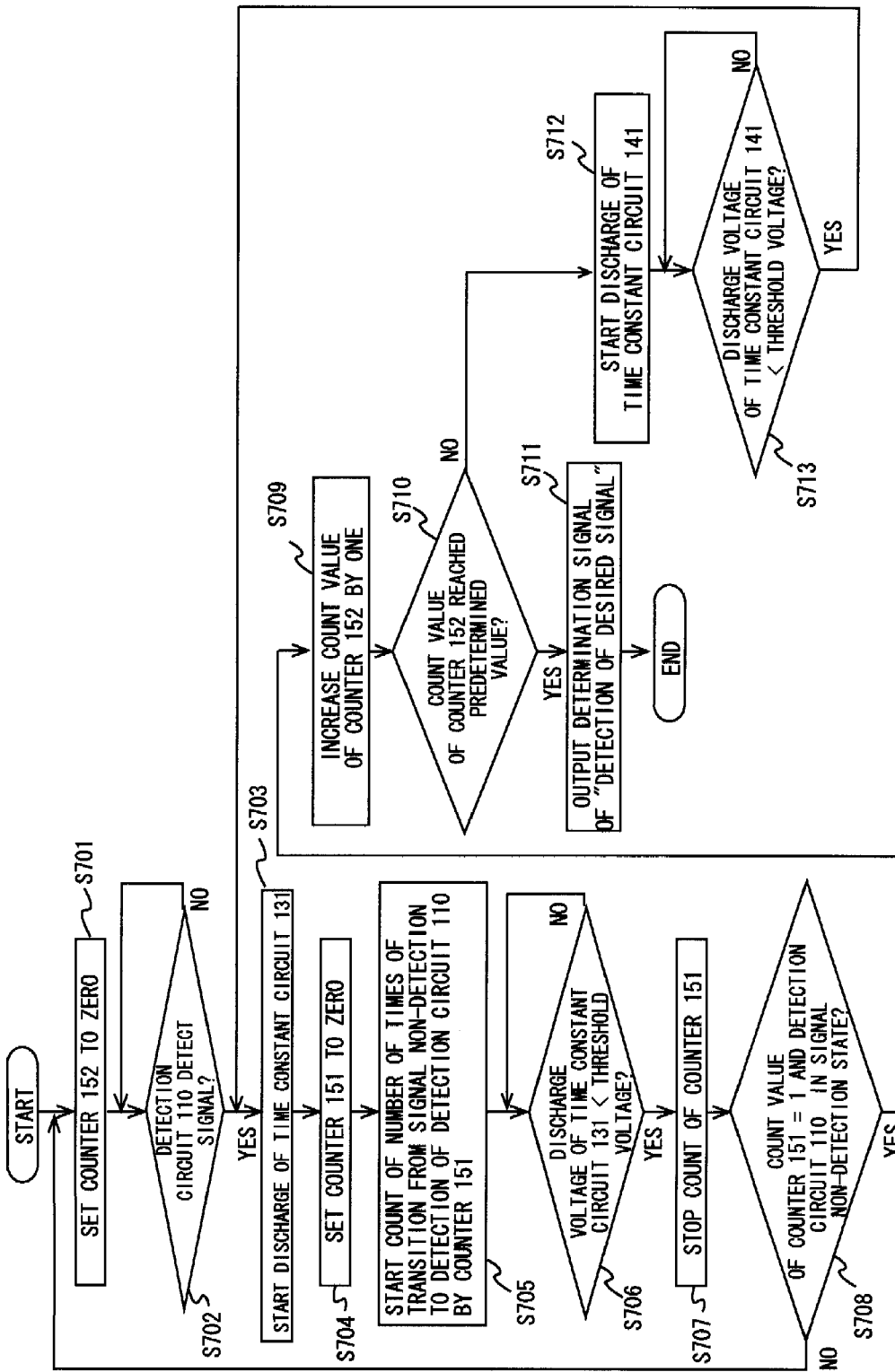
FIG. 23 shows a flow chart of the operation of a signal processing device according to a seventh exemplary embodiment.

The specific seventh exemplary embodiment to which the present invention is applied will be described hereinafter in detail with reference to the drawings. FIG. 23 shows a flow chart of the operation of a signal processing device 700 according to the seventh exemplary embodiment. Since the configuration of the signal processing device 700 is the same as that of the first exemplary embodiment, the description is omitted. The operation of the determination circuit 150 in the seventh exemplary embodiment is different from that in the first exemplary embodiment. This point will be described with reference to the flow chart in FIG. 23.

FIG. 23 shows a flow chart of the operation of the signal processing device 700. First, the count value of the counter 152 is reset to zero (S701). Then, it is monitored whether the detection circuit 110 detects the signal (S702). When the detection circuit 110 detects the signal (Yes in S702), the discharge operation of the time constant circuit 131 is started (S703). When the detection circuit 110 does not detect the signal (No in S702), the operation goes back to S702, and the monitoring operation is continued.

Next, the count value of the counter 151 is reset to zero (S704), and the counter 151 starts the count operation of the number of times of transition from the "no-signal-detection-state" to the "signal-detection-state" of the detection circuit 110 (S705).

When the discharge voltage of the time constant circuit 131 is the predetermined threshold voltage or more (No in S706), the operation goes back to S706. In other words, the timer operation of the timer 130 (discharge operation of the time constant circuit 131) is continued for the period ΔT1. When the discharge voltage of the time constant circuit 131 is lower than the predetermined threshold voltage (Yes in S706), the count operation of the counter 151 is stopped (S707).

When the count value of the counter 151 is "1" and the detection circuit 110 is in no signal detection state (Yes in S708), the count value of the counter 152 is increased by one (S709). Otherwise (No in S708), the operation goes back to the initial state (S701).

Next, when the count value of the counter 152 has reached the predetermined value (Yes in S710), it is determined that the desired signal has been detected, and the high-level determination signal is output (S711). When the count value has not reached the predetermined value (No in S710), the discharge operation of the time constant circuit 141 is started (S712).

When the discharge voltage of the time constant circuit 141 is the predetermined threshold voltage or more (No in S713), the operation goes back to S713. In other words, the timer operation of the timer 140 (discharge operation of the time constant circuit 141) is continued for the period ΔT2. When the discharge voltage of the time constant circuit 141 is lower than the predetermined threshold voltage (Yes in S713), the operation goes back to S703, and the discharge of the time constant circuit 131 is started.

Figure 24:
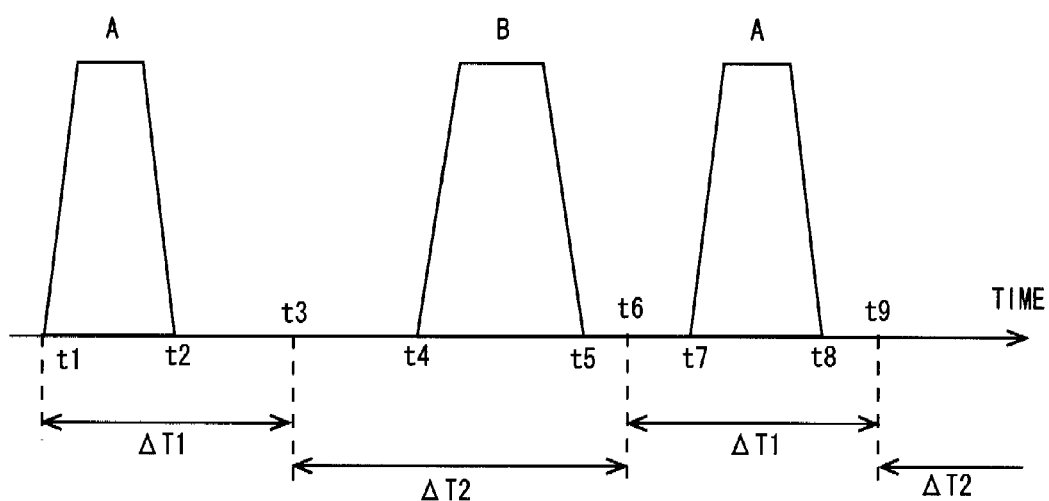
FIG. 24 shows a schematic diagram for describing the operation of the signal processing device according to the seventh exemplary embodiment.

FIG. 24 shows a schematic diagram for describing the operation of the signal processing device 700. FIG. 24 shows a relation between the signal from the discrimination circuit 120 corresponding to the detection signal of the detection circuit 110, and the timer operation period ΔT1 of the timer 130 (discharge period of the time constant circuit 131) and the timer operation period ΔT2 of the timer 140 (discharge period of the time constant circuit 141). As shown in FIG. 24, the rising of the desired signal A is detected at time t1, and the period ΔT1 is started. When the falling of the desired signal A is detected at time t2 in the period ΔT1, the counter 151 counts up. At time t3, the period ΔT1 ends, and the signal is kept fallen. Then, the counter 152 counts up, and the period ΔT2 is started at the same time. During the period ΔT2, the determination circuit 150 cannot detect the rising or falling of the output signal of the detection circuit. Accordingly, even when the undesired signal B is input at time t4, the determination circuit 150 cannot detect the rising or falling of the undesired signal B at time t4, t5, and there is no change in the count values of the counters 151 and 152.

At time t6, the period ΔT2 ends, and the period ΔT1 is started at the same time. After that, the rising and falling of the desired signal A are detected at time t7, t8, and the counter 151 counts up. At time t9, the period ΔT1 ends, the counter 152 counts up, and the period ΔT2 is started at the same time. The similar operation is repeated in the following process.

There are two characteristics in the operation flow chart in the seventh exemplary embodiment in FIG. 23. One is that the number of times that the output of the detection circuit 110 is fallen is counted in the period ΔT1, which is the timer operation of the timer 130 (discharge period of the time constant circuit 131). The other one is that the condition determination is performed that the count value of the counter 151 is "1", or the number of times of falling of the detection signal is "1" and the signal of the detection circuit 110 is fallen, or the next burst signal is not coming at a time when the timer operation of the timer 130 is completed. According to these processings, the operation of detecting a pair of rising and falling is realized in the timer operation of the timer 130.

As described above, according to the signal processing device 700 of the seventh exemplary embodiment, detecting the signal whose burst is shorter than the desired signal, or the signal in which two or more rising is observed within the period ΔT1 as the desired signal can be prevented. However, as the period of the detection operation is the sum of the periods ΔT1 and ΔT2, it is required to minimize the variations due to the manufacturing or temperature of the time constants ΔT1, ΔT2 of each of the time constant circuits 131, 141.

Eighth Exemplary Embodiment

Figure 25:
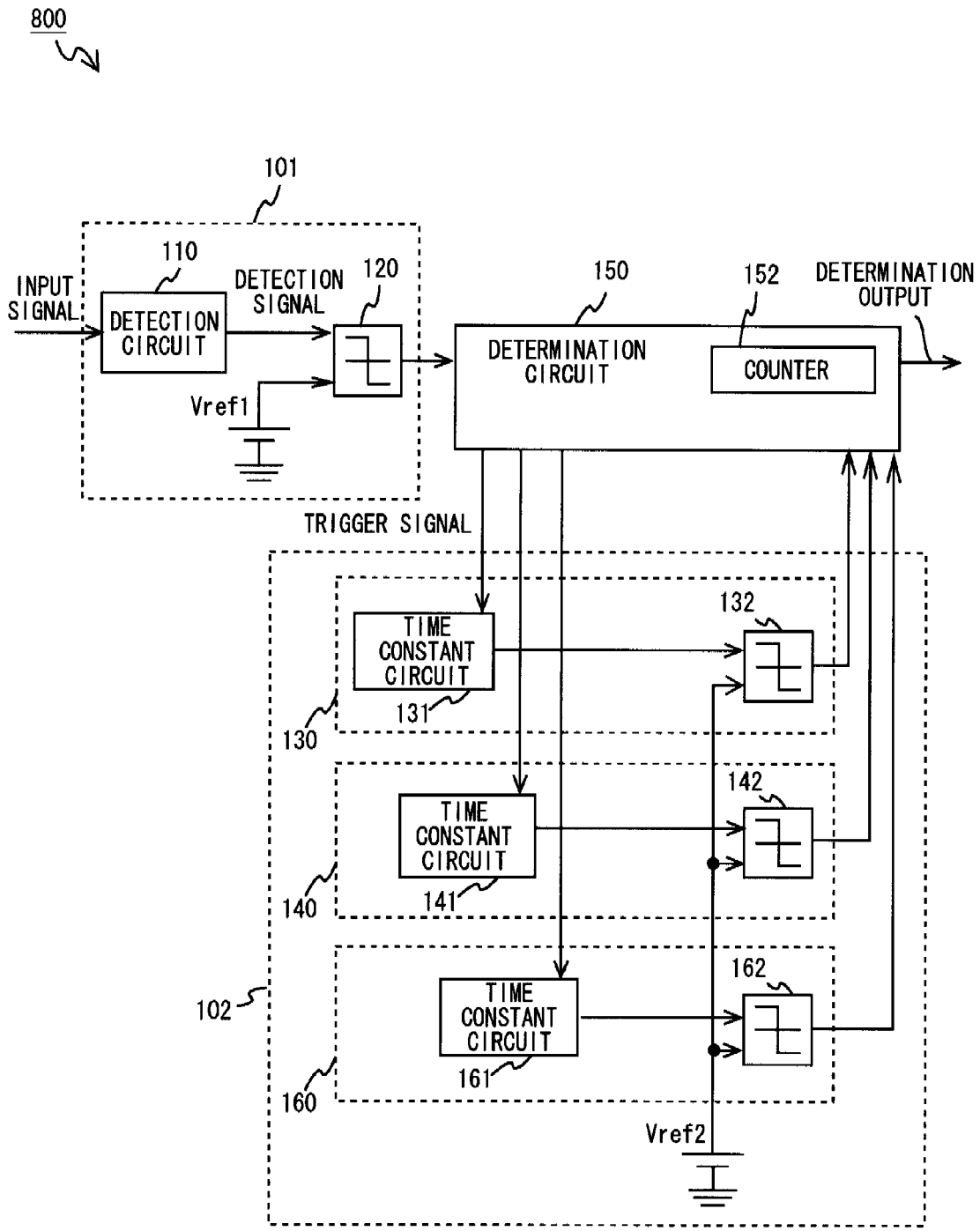
FIG. 25 shows a configuration of a signal processing device according to an eighth exemplary embodiment.

The specific eighth exemplary embodiment to which the present invention is applied will be described hereinafter in detail with reference to the drawings. FIG. 25 shows a configuration of a signal processing device 800 according to the eighth exemplary embodiment. The eighth exemplary embodiment is different from the first exemplary embodiment in that three timers are employed instead of two.

As shown in FIG. 25, the configuration of the signal processing device 800 is substantially the same as that of the first exemplary embodiment except the determination circuit 150 and the timer 160. Thus, description other than the determination circuit 150 and the timer 160 will be omitted.

The timer 160 includes a time constant circuit 161 and a comparator 162. The time constant circuit 161 has the similar configuration as that of the time constant circuits 131, 141, and accordingly, the detailed description will be omitted. However, the time constant included in the time constant circuit 161 is ΔT3 (hereinafter referred to as period ΔT3). Further, the comparator 162 has the similar configuration as that of the comparators 132, 142, and accordingly, the detailed description will be omitted. Thus, the timer 160 starts its operation with the trigger and outputs the high-level output signal after the period ΔT3.

Further, as the timer 160 is added, the operation of the determination circuit 150 is different from that of the first exemplary embodiment. The operation of the signal processing device 800 including this point will be described with reference to the flow chart of the operation of FIGS. 26A, 26B. The counter 151 may not be specifically employed in the eighth exemplary embodiment.

Figure 26A:
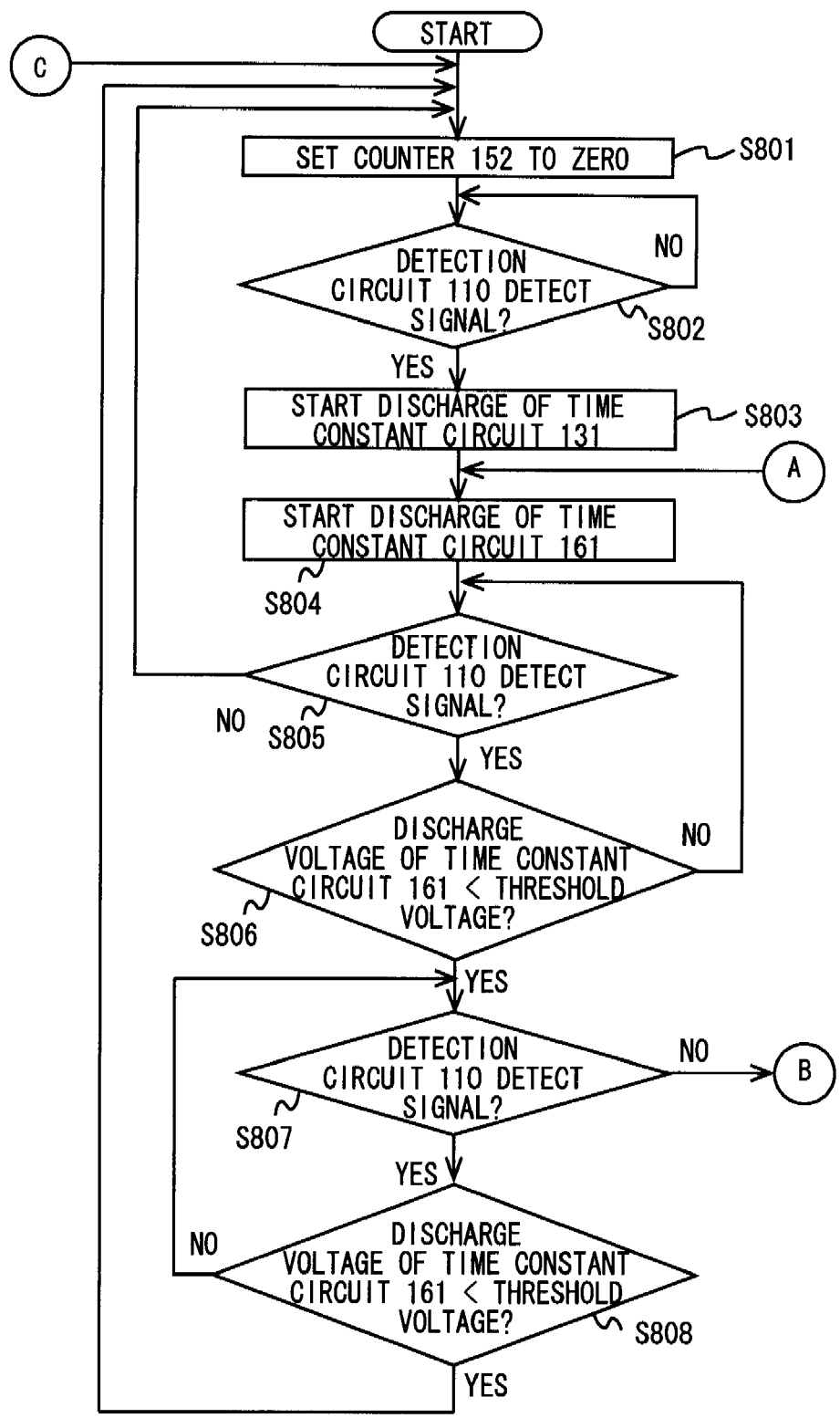
FIG. 26A shows a flow chart of the operation of the signal processing device according to the eighth exemplary embodiment.
Figure 26B:
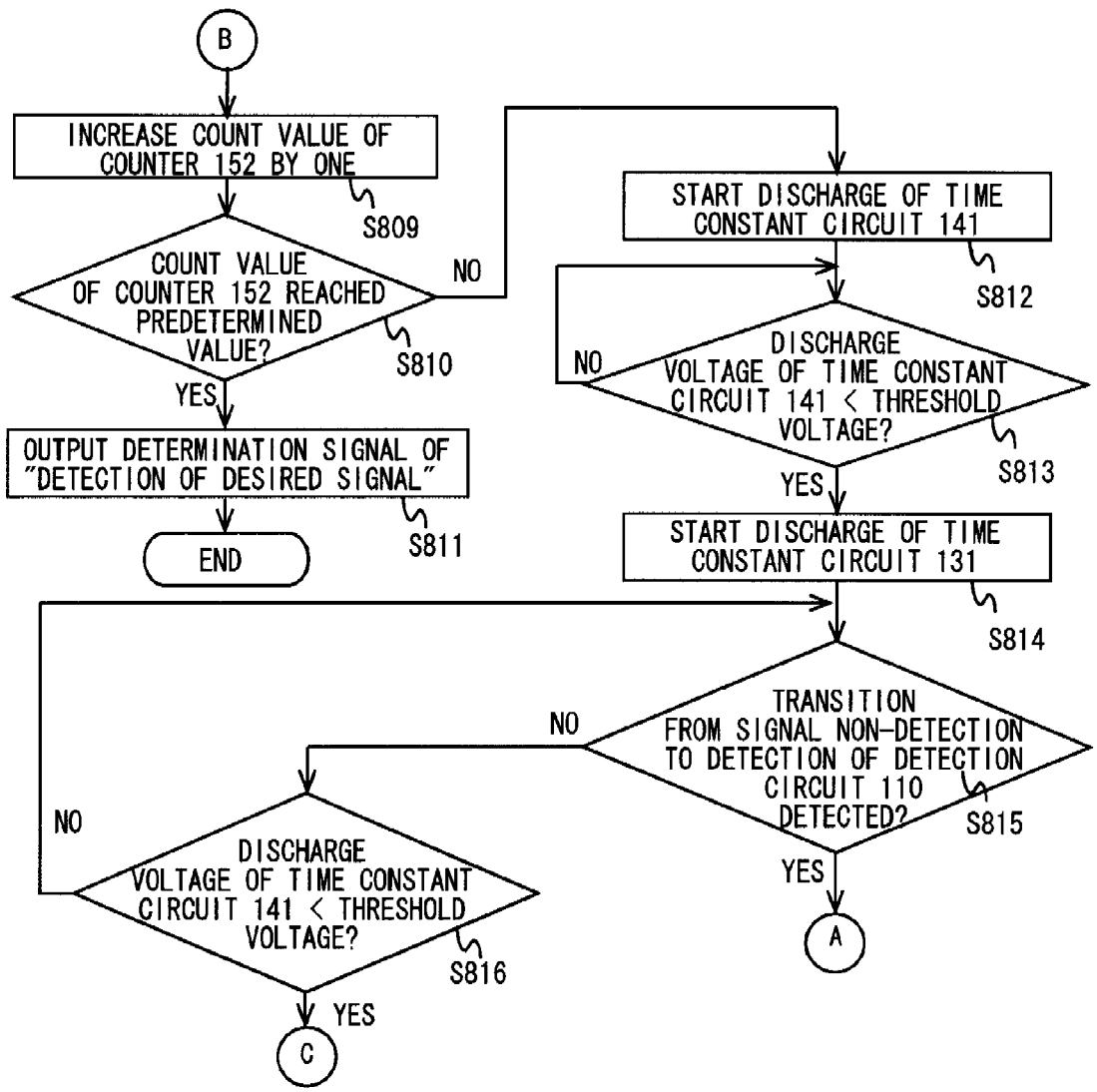
FIG. 26B shows a flow chart of the operation of the signal processing device according to the eighth exemplary embodiment.

FIGS. 26A, 26B show a flow chart of the operation of the signal processing device 800. First, the count value of the counter 152 is reset to zero (S801). Next, it is monitored whether the detection circuit 110 detects the signal (S802). When the detection circuit 110 detects the signal (Yes in S802), the discharge operation of the time constant circuit 131 is started (S803). When the detection circuit 110 does not detect the signal (No in S802), the operation goes back to S802, and the monitoring operation is continued.

Next, the discharge operation of the time constant circuit 161 is started (S804). Then, it is monitored whether the detection circuit 110 detects the signal (S805). When the detection circuit 110 does not detect the signal (No in S805), the operation goes back to the initial state (S801).

When the detection circuit 110 detects the signal (Yes in S805) and the discharge voltage of the time constant circuit 161 is the predetermined threshold voltage or more (No in S806), the operation goes back to S805. In other words, the determination circuit 150 determines whether the detection circuit 110 detects the signal at the period ΔT3.

When the detection circuit 110 detects the signal (Yes in S805), and the discharge voltage of the time constant circuit 161 is lower than the predetermined threshold voltage (Yes in S806), it is monitored whether the detection circuit 110 detects the signal (S807).

Next, when the detection circuit 110 does not detect the signal (No in S807), the count value of the counter 152 is increased by "1" (S809). When the detection circuit 110 detects the signal (Yes in S807), and the discharge voltage of the time constant circuit 131 is lower than the predetermined threshold voltage (Yes in S808), the operation goes back to the initial state (S801). When the detection circuit 110 detects the signal (Yes in S807), and the discharge voltage of the time constant circuit 131 is the predetermined threshold voltage or more (No in S808), the operation goes back to S807. In other words, it is determined whether the determination circuit 150 detects the falling of the detection signal at the period ΔT1.

Next, when the count value of the counter 152 has reached the predetermined value (Yes in S810), it is determined that the desired signal is detected, and the high-level determination signal is output (S811). When the count value of the counter 152 has not reached the predetermined value (No in S810), the discharge operation of the time constant circuit 141 is started (S812).

When the discharge voltage of the time constant circuit 141 is the predetermined threshold voltage or more (No in S813), the operation goes back to S813. In other words, the timer operation of the timer 140 is continued for the period ΔT2. When the discharge voltage of the time constant circuit 141 is lower than the predetermined threshold voltage (Yes in S813), the discharge of the time constant circuit 131 is started (S814).

Next, when the determination circuit 150 detects the state transition from the "no-signal-detection-state" to the "signal-detection-state" of the detection circuit 110 (Yes in S815), the operation goes back to S804. When the state transition from the "no-signal-detection-state" to the "signal-detection-state" of the detection circuit 110 has not been detected (No in S815), and the discharge voltage of the time constant circuit 131 is the predetermined threshold voltage or more (No in S816), the operation goes back to S815. In other words, it is determined by the determination circuit 150 whether the rising of the detection signal is detected in the period ΔT1. When the state transition from the "no-signal-detection-state" to the "signal-detection-state" of the detection circuit 110 has not been detected (No in S815), and the discharge voltage of the time constant circuit 131 is lower than the predetermined threshold voltage (Yes in S816), the operation goes back to the initial state (S801). In other words, the determination circuit 150 determines that the rising of the detection signal is not detected in the period ΔT1, and the operation goes back to the initial state.

Figure 27:
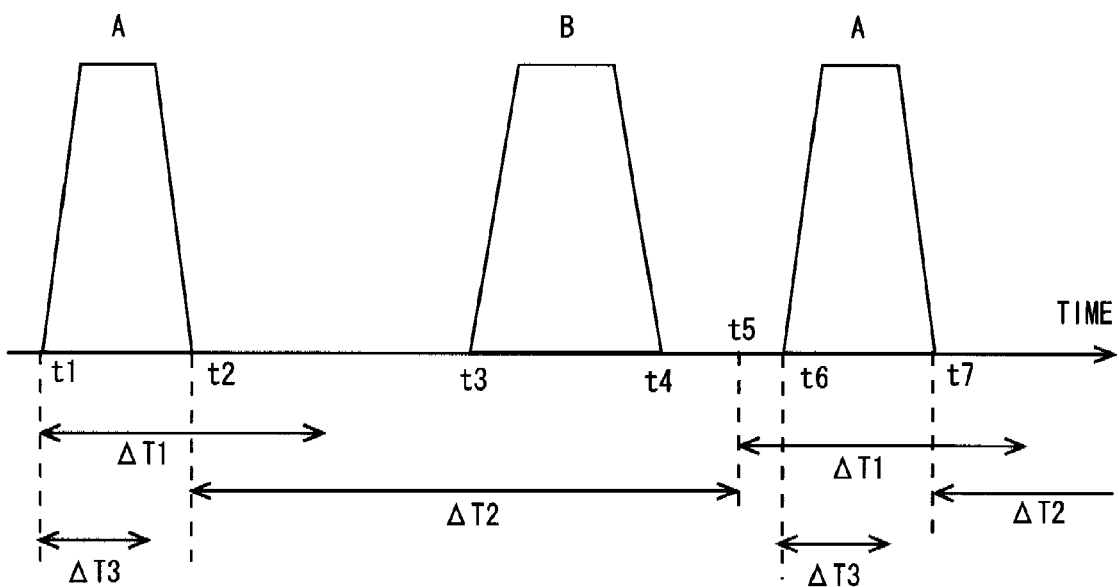
FIG. 27 shows a schematic diagram for describing the operation of the signal processing device according to the eighth exemplary embodiment.

FIG. 27 shows a schematic diagram for describing the operation of the signal processing device 800. FIG. 27 shows a relation among the signal from the discrimination circuit 120 corresponding to the detection signal of the detection circuit 110, the timer operation period ΔT1 of the timer 130 (discharge period of the time constant circuit 131), the timer operation period ΔT2 of the timer 140 (discharge period of the time constant circuit 141), and the timer operation period ΔT3 of the timer 160 (discharge period of the time constant circuit 161). As shown in FIG. 27, at time t1, the rising of the desired signal A is detected, and the period ΔT1 and the period ΔT3 are started. When the falling of the desired signal A is detected at time t2 within the period ΔT1 after the period ΔT3 ends, the counter 152 counts up. The period ΔT2 is further started. At the period ΔT2, the determination circuit 150 cannot detect the rising or falling of the detection signal. Accordingly, even when the undesired signal B is input at time t3, the determination circuit 150 cannot detect the rising and the falling of the undesired signal B of time t3 and t4, and there is no change in the count value of the counter 152.

At time t5, the period ΔT2 ends, and the period ΔT1 is started at the same time. After that, the rising of the desired signal A is detected at time t6 in the period ΔT1, and the period ΔT3 is started. When the falling of the desired signal A is detected at time t7 within the period ΔT1 after the period ΔT3 ends, the counter 152 counts up, and the period ΔT2 is started. The similar operation is repeated in the following process.

As described above, the signal processing device 800 according to the eighth exemplary embodiment can determine the signal (signal A in FIG. 27) in which the burst signal whose duration time is longer than the discharge time (period ΔT3) of the time constant circuit 161 and shorter than the period ΔT1 is arranged with the interval longer than the period ΔT2 and the burst time length of the burst signal and shorter than the sum of the periods ΔT2 and ΔT1 as the desired signal.

Ninth Exemplary Embodiment

Figure 28A:
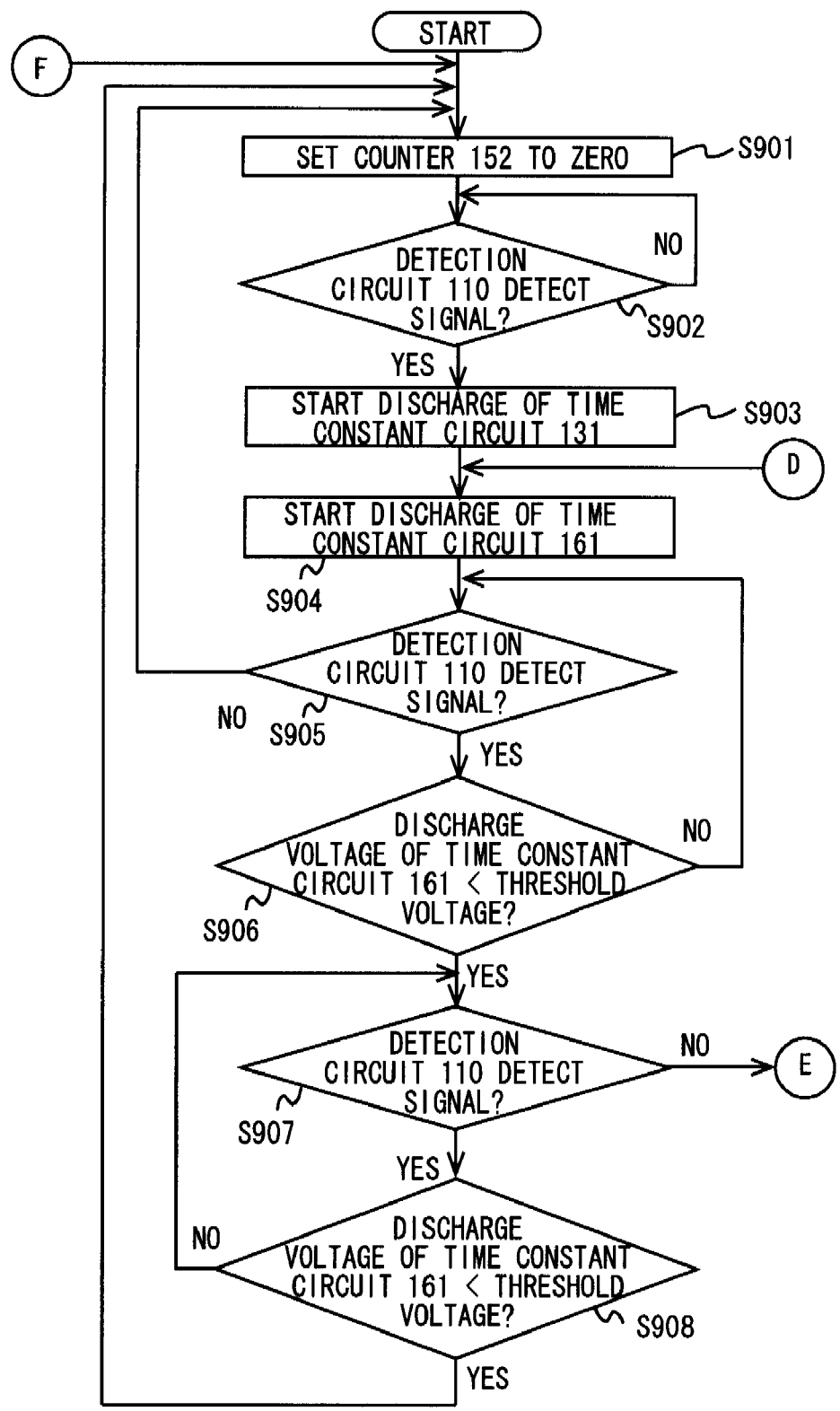
FIG. 28A shows a flow chart of the operation of a signal processing device according to a ninth exemplary embodiment.
Figure 28B:
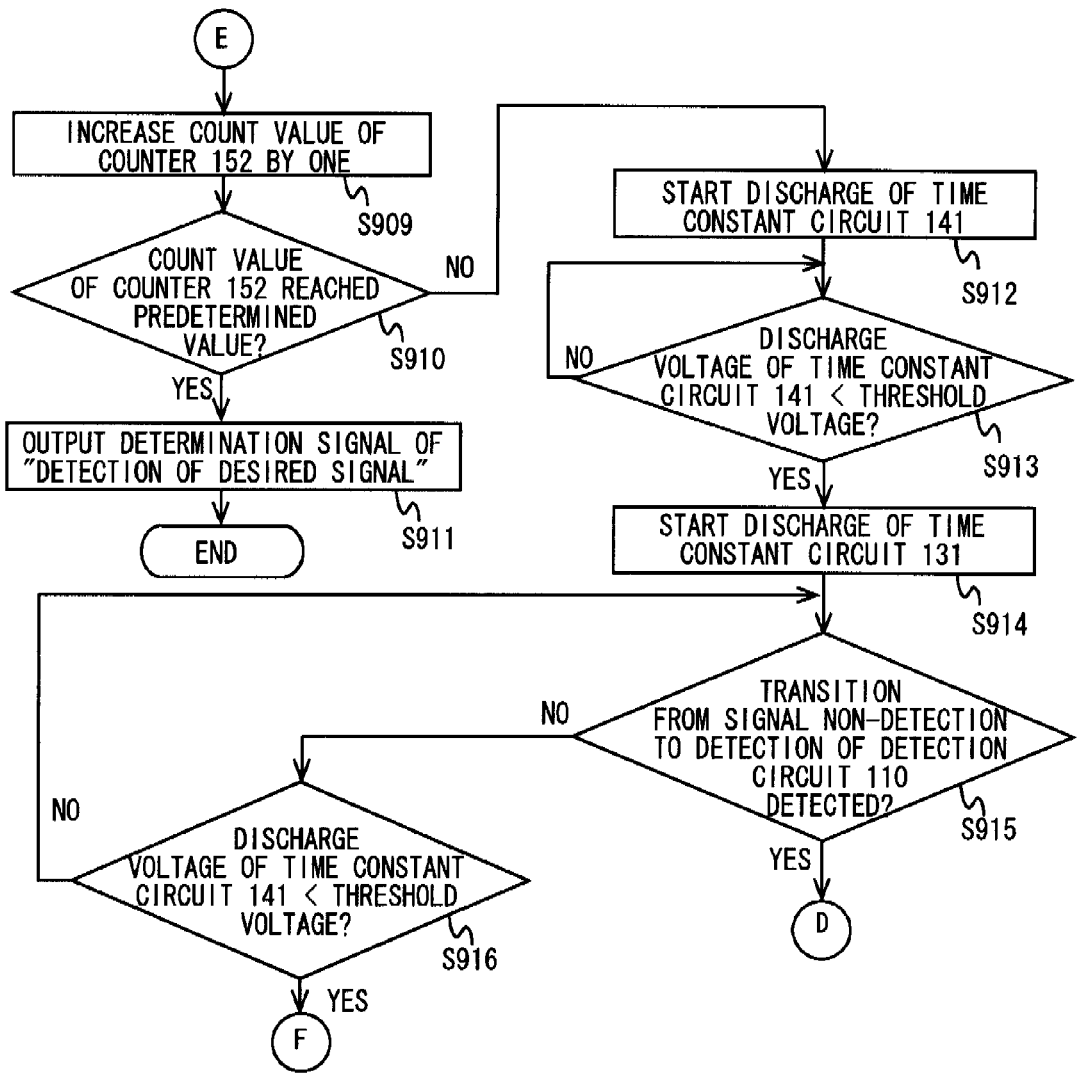
FIG. 28B shows a flow chart of the operation of a signal processing device according to a ninth exemplary embodiment.

The specific ninth exemplary embodiment to which the present invention is applied will be described hereinafter in detail with reference to the drawings. FIGS. 28A, 28B show a flow chart of the operation of a signal processing device 900 according to the ninth exemplary embodiment. Since the configuration of the signal processing device 900 is the same as that of the eighth exemplary embodiment, the description will be omitted. The operation of the determination circuit 150 in the ninth exemplary embodiment is different from that in the eighth exemplary embodiment. The operation of the signal processing device 900 including this point will be described with reference to the flow chart of FIGS. 28A, 28B.

FIGS. 28A, 28B show a flow chart of the operation of the signal processing device 900. First, the count value of the counter 152 is reset to zero (S901). Next, it is monitored whether the detection circuit 110 detects the signal (S902). When the detection circuit 110 detects the signal (Yes in S902), the discharge operation of the time constant circuit 131 is started (S903). When the detection circuit 110 does not detect the signal (No in S902), the operation goes back to S902, and the monitoring operation is continued.

Next, the discharge operation of the time constant circuit 161 is started (S904). Then, it is monitored whether the detection circuit 110 detects the signal (S905). When the detection circuit 110 does not detect the signal (No in S905), the operation goes back to the initial state (S901). In other words, the operation goes back to the initial state when the detection signal is fallen in the periods ΔT1 and ΔT3.

When the detection circuit 110 detects the signal (Yes in S905) and the discharge voltage of the time constant circuit 131 is the predetermined threshold voltage or more (No in S906), the operation goes back to S905. In other words, the determination circuit 150 determines whether the detection signal is detected in the period ΔT1.

When the detection circuit 110 detects the signal (Yes in S905) and the discharge voltage of the time constant circuit 131 is lower than the predetermined threshold voltage (Yes in S906), it is monitored whether the detection circuit 110 detects the signal (S907). When the detection circuit 110 does not detect the signal (No in S907), the count value of the counter 152 is increased by "1" (S909).

When the detection circuit 110 detects the signal (Yes in S907) and the discharge voltage of the time constant circuit 161 is lower than the predetermined threshold voltage (Yes in S908), the operation goes back to the initial state (S901). When the detection circuit 110 detects the signal (Yes in S907) and the discharge voltage of the time constant circuit 161 is the predetermined threshold voltage or more (No in S908), the operation goes back to S907. In other words, in the period ΔT3, the determination circuit 150 determines whether the falling of the detection signal is detected.

Next, when the count value of the counter 152 reaches the predetermined value (Yes in S910), it is determined that the desired signal is detected, and the high-level determination signal is output (S911). When the count value of the counter 152 has not reached the predetermined value (No in S910), the discharge operation of the time constant circuit 141 is started (S912).

When the discharge voltage of the time constant circuit 141 is the predetermined threshold voltage or more (No in S913), the operation goes back to S913. In other words, the timer operation of the timer 140 is continued for the period ΔT2. When the discharge voltage of the time constant circuit 141 is lower than the predetermined threshold voltage (Yes in S913), the discharge of the time constant circuit 131 is started (S914).

When the determination circuit 150 detects the state transition from the "no-signal-detection-state" to the "signal-detection-state" of the detection circuit 110 (Yes in S915), the operation goes back to S904. When the state transition from the "no-signal-detection-state" to the "signal-detection-state" of the detection circuit 110 is not detected (No in S915), and the discharge voltage of the time constant circuit 131 is the predetermined threshold voltage or more (No in S916), the operation goes back to S915. In other words, the determination circuit 150 determines whether the rising of the detection signal is detected at the period ΔT1. When the state transition from the "no-signal-detection-state" to the "signal-detection-state" of the detection circuit 110 is not detected (No in S915), and the discharge voltage of the time constant circuit 131 is lower than the predetermined threshold voltage (Yes in S916), the operation goes back to the initial state (S901). In summary, the determination circuit 150 determines that the rising of the detection signal has not been detected at the period ΔT1, and the operation goes back to the initial state.

Figure 29:
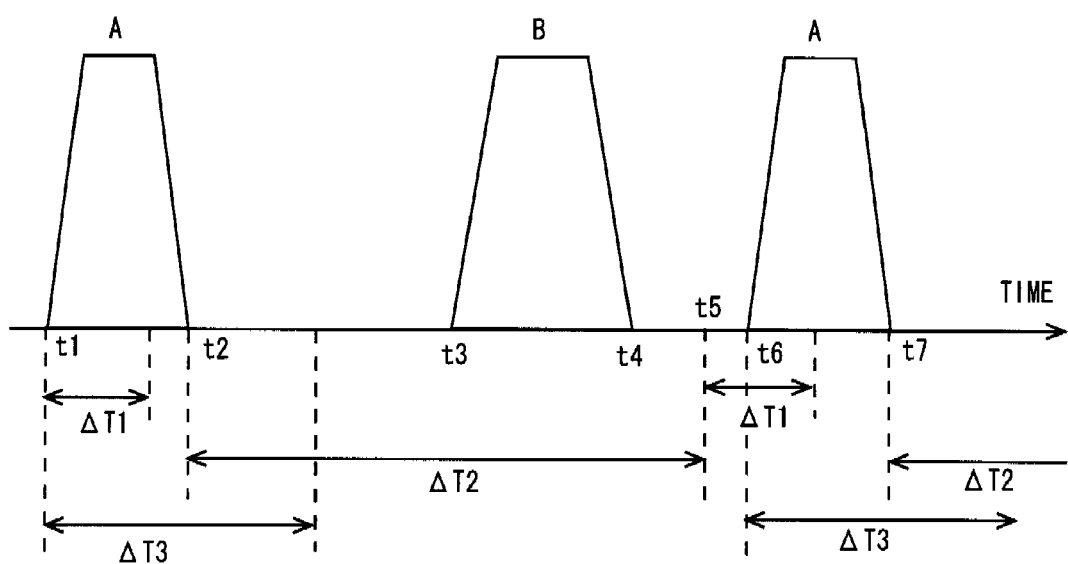
FIG. 29 shows a schematic diagram for describing the operation of the signal processing device according to the ninth exemplary embodiment.

FIG. 29 shows a schematic diagram for describing the operation of the signal processing device 900. FIG. 29 shows a relation among the signal from the discrimination circuit 120 corresponding to the detection signal of the detection circuit 110, the timer operation period $\Delta T1$ of the timer 130 (discharge period of the time constant circuit 131), the timer operation period $\Delta T2$ of the timer 140 (discharge period of the time constant circuit 141), and the timer operation period $\Delta T3$ of the timer 160 (discharge period of the time constant circuit 161). As shown in FIG. 29, at time t1, the rising of the desired signal A is detected, and the period $\Delta T1$ and the period $\Delta T3$ are started. When the falling of the desired signal A is detected at time t2 in the period $\Delta T3$ after the period $\Delta T1$ ends, the counter 152 counts up. The period $\Delta T2$ is further started. In the period $\Delta T2$, the determination circuit 150 cannot detect the rising or falling of the detection signal. Accordingly, even when the undesired signal B is input at time t3, the determination circuit 150 cannot detect the rising or falling of the undesired signal B at time t3, t4, and there is no change in the count value of the counter 152.

At time t5, the period $\Delta T2$ ends, and the period $\Delta T1$ is started at the same time. After that, the rising of the desired signal A is detected at time t6 in the period $\Delta T1$, and the period $\Delta T3$ is started. When the falling of the desired signal A is detected at time t7 in the period $\Delta T3$ after the period $\Delta T1$ ends, the counter 152 counts up, and the period $\Delta T2$ is started. The similar operation is repeated in the following process.

As described above, the signal processing device 900 according to the ninth exemplary embodiment can determine the signal (signal A in FIG. 29) in which the burst signal whose duration time is longer than the overlap time of the periods $\Delta T1$ and $\Delta T3$ and shorter than the time from when the period $\Delta T1$ is started until when the period $\Delta T3$ ends is arranged with the interval longer than the sum of the period $\Delta T2$ and the burst time length and shorter than the sum of the periods $\Delta T2$ and $\Delta T1$ and the burst time length of the burst signal as the desired signal.

Tenth Exemplary Embodiment

Figure 30:
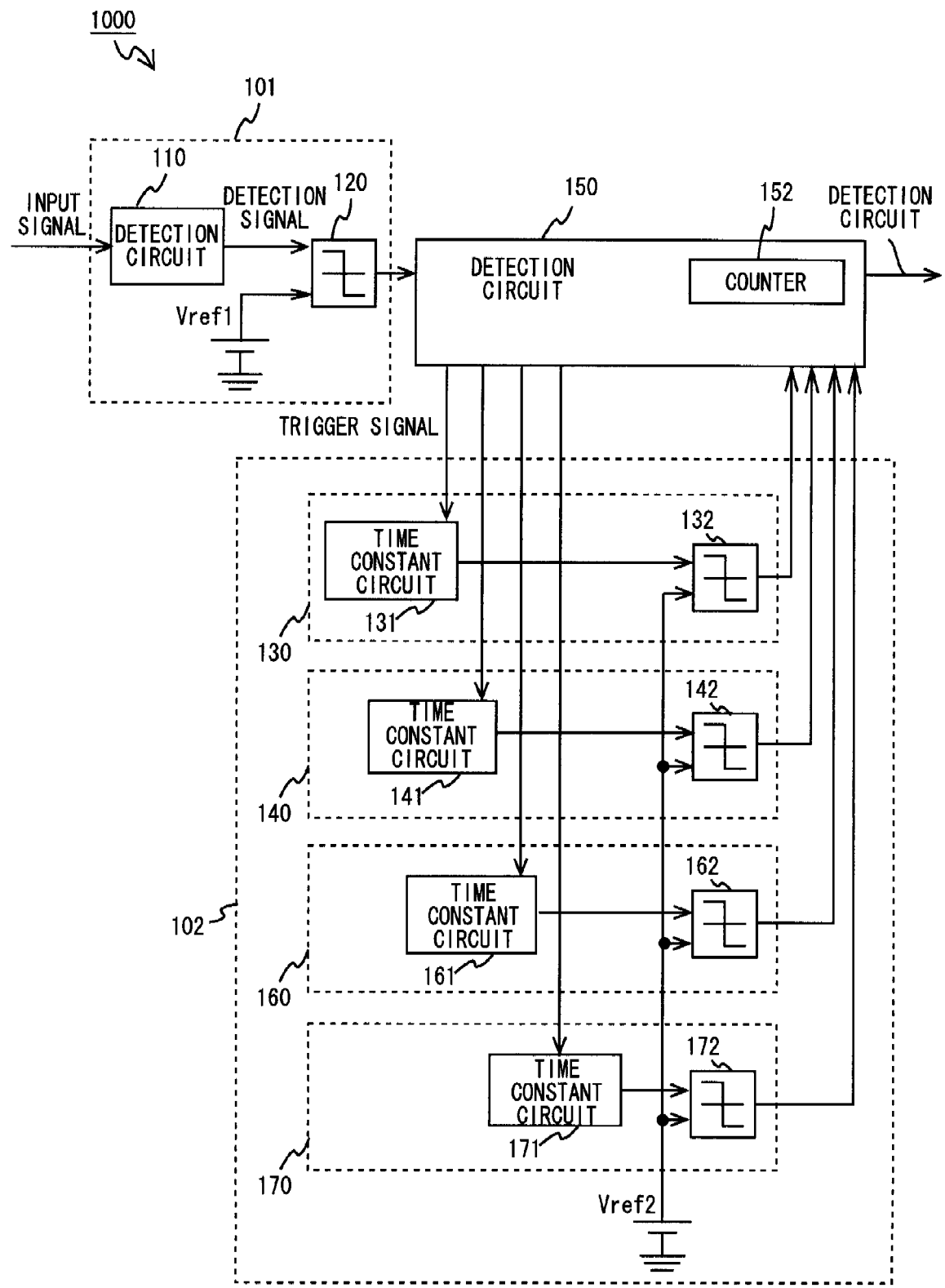
FIG. 30 shows a configuration of a signal processing device according to a tenth exemplary embodiment.

The specific tenth exemplary embodiment to which the present invention is applied will be described hereinafter in detail with reference to the drawings. FIG. 30 shows a configuration of a signal processing device 1000 according to the tenth exemplary embodiment. The tenth exemplary embodiment is different from the eighth exemplary embodiment in that four timers are employed instead of three.

As shown in FIG. 30, the configuration of the signal processing device 1000 is substantially the same as that of the eighth exemplary embodiment except the determination circuit 150 and the timers 160, 170. Thus, description other than the determination circuit 150 and the timer 160 will be omitted.

The timer 170 includes a time constant circuit 171 and a comparator 172. The time constant circuit 171 has the similar configuration as that of the time constant circuits 131, 141, 161, and accordingly, the detailed description will be omitted. However, the time constant included in the time constant circuit 171 is $\Delta T4$ (hereinafter referred to as period $\Delta T4$). Further, the comparator 172 also has the similar configuration as that of the comparators 132, 142, 162, and accordingly, the detailed description will be omitted. Thus, the timer 170 starts its operation with the trigger and outputs the high-level output signal after the period $\Delta T4$.

Further, as the timer 170 is added, the operation of the determination circuit 150 is different from that in the eighth exemplary embodiment. Thus, the operation of the signal processing device 1000 including this point will be described with a flow chart showing the operation in FIGS. 31A, 31B. Note that the counter 151 is not necessary also in the tenth exemplary embodiment.

Figure 31A:
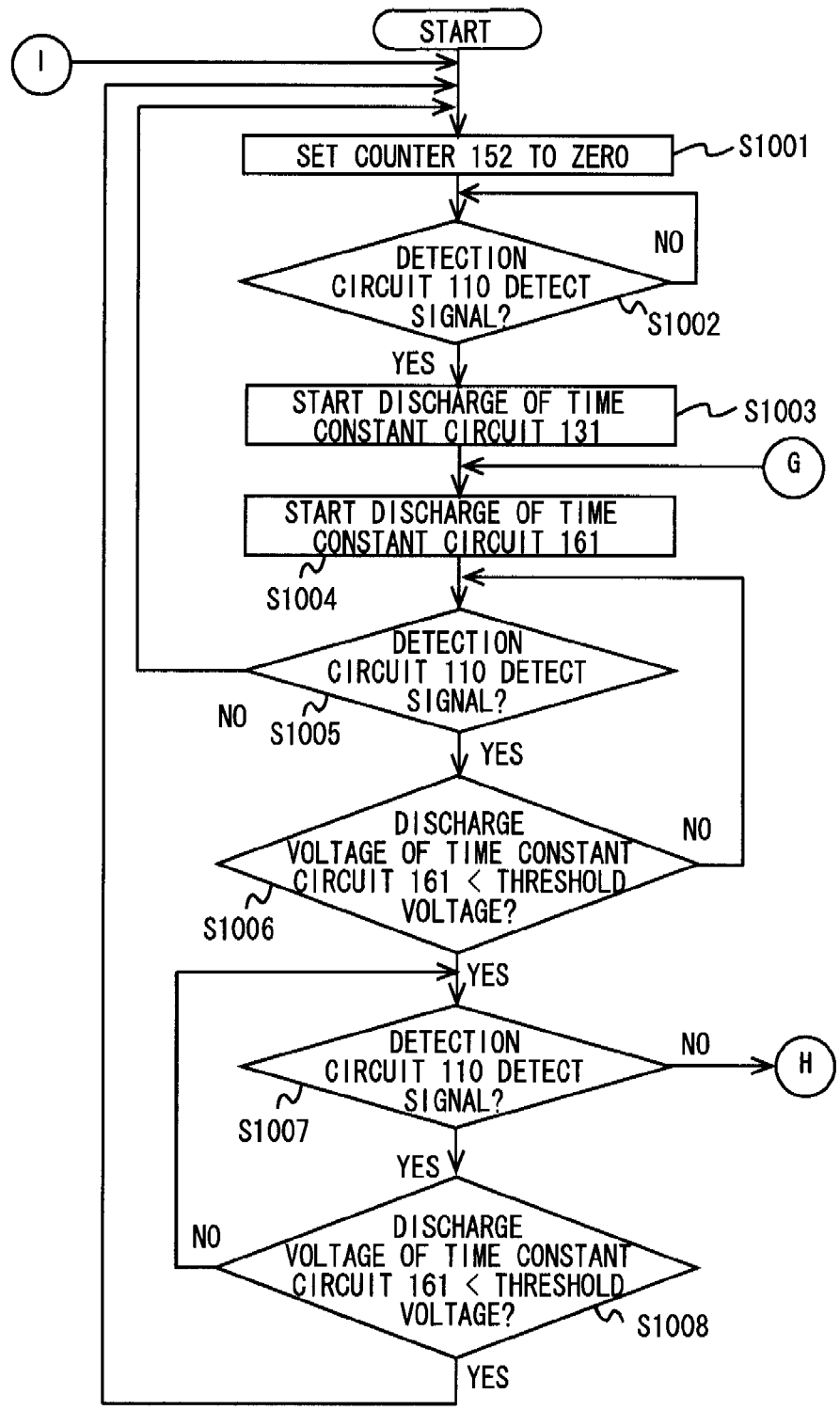
FIG. 31A shows a flow chart of the operation of the signal processing device according to the tenth exemplary embodiment.
Figure 31B:
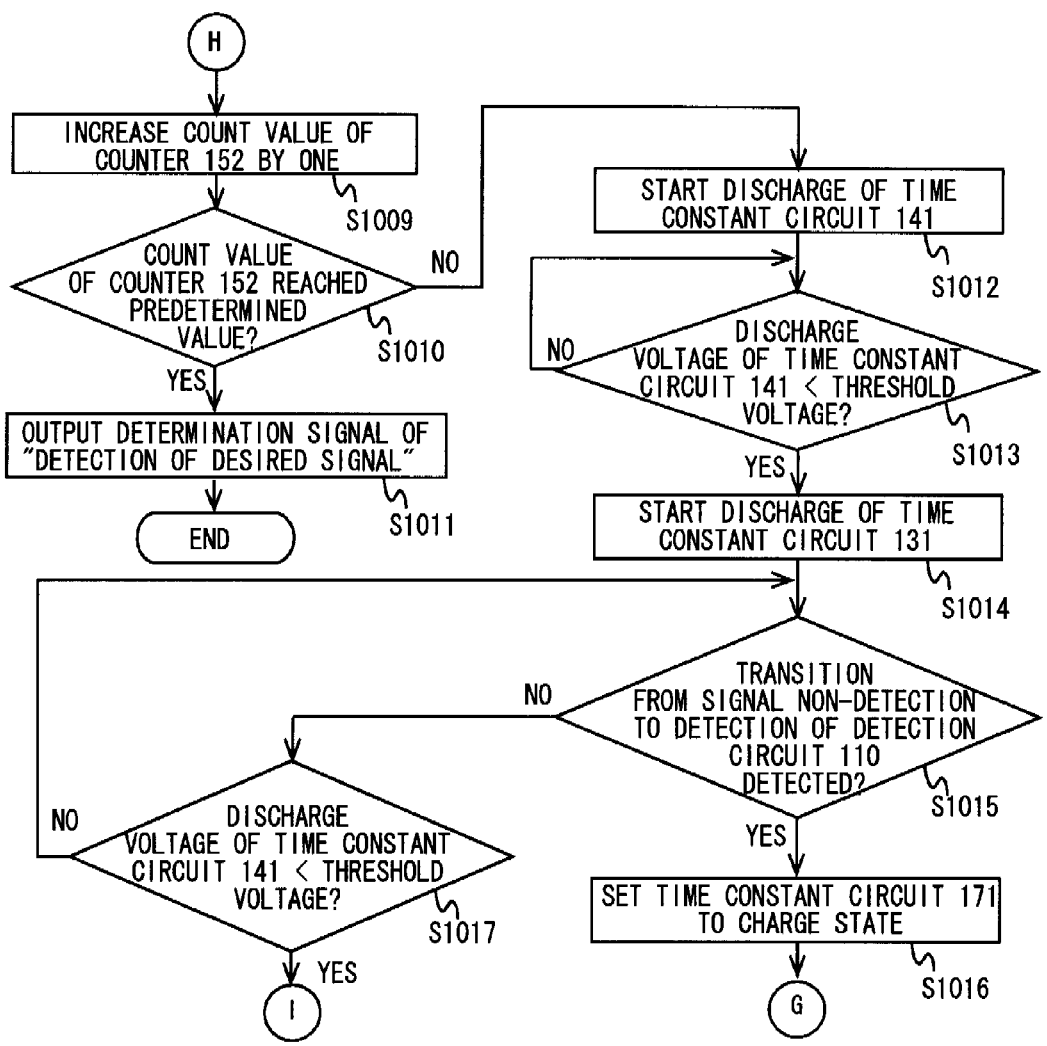
FIG. 31B shows a flow chart of the operation of the signal processing device according to the tenth exemplary embodiment.

FIGS. 31A, 31B shows flow chart of the operation of the signal processing device 1000. First, the count value of the counter 152 is reset to zero (S1001). Next, it is monitored whether the detection circuit 110 detects the signal (S1002). When the detection circuit 110 detects the signal (Yes in S1002), the discharge operation of the time constant circuit 131 is started (S1003). When the detection circuit 110 does not detect the signal (No in S1002), the operation goes back to S1002, and the monitoring operation is continued.

Next, the discharge operation of the time constant circuit 161 is started (S1004). Next, it is monitored whether the detection circuit 110 detects the signal (S1005). When the detection circuit 110 does not detect the signal (No in S1005), the operation goes back to the initial state (S1001).

When the detection circuit 110 detects the signal (Yes in S1005) and the discharge voltage of the time constant circuit 161 is the predetermined threshold voltage or more (No in S1006), the operation goes back to S1005. In other words, the determination circuit 150 determines whether the detection circuit 110 detects the signal in the period $\Delta T3$.

When the detection circuit 110 detects the signal (Yes in S1005), and the discharge voltage of the time constant circuit 161 is lower than the predetermined threshold voltage (Yes in S1006), it is monitored whether the detection circuit 110 detects the signal (S1007).

Next, when the detection circuit 110 does not detect the signal (No in S1007), the count value of the counter 152 is increased by "1" (S1009). When the detection circuit 110 detects the signal (Yes in S1007) and the discharge voltage of the time constant circuit 131 is lower than the predetermined threshold voltage (Yes in S1008), the operation goes back to the initial state (S1001). When the detection circuit 110 detects the signal (Yes in S1007) and the discharge voltage of the time constant circuit 131 is the predetermined threshold voltage or more (No in S1008), the operation goes back to S1007. In summary, the determination circuit 150 determines whether the falling of the detection signal is detected in the period $\Delta T1$.

Next, when the count value of the counter 152 has reached the predetermined value (Yes in S1010), it is determined that the desired signal is detected, and the high-level determination signal is output (S1011). When the count value of the counter 152 has not reached the predetermined value (No in S1010), the discharge operation of the time constant circuit 141 is started (S1012).

When the discharge voltage of the time constant circuit 141 is the predetermined threshold voltage or more (No in S1013), the operation goes back to S1013. In other words, the timer operation of the timer 140 is continued for the period $\Delta T2$. When the discharge voltage of the time constant circuit 141 is lower than the predetermined threshold voltage (Yes in S1013), the discharge operation of the time constant circuit 171 is started (S1014). In summary, the period $\Delta T2$ ends, and the period $\Delta T4$ is started.

Next, when the determination circuit 150 detects the state transition from the "no-signal-detection-state" to the "signal-detection-state" of the detection circuit 110 (Yes in S1015), the time constant circuit 171 is set to the charge state (S1016). When the state transition from the "no-signal-detection-state" to the "signal-detection-state" of the detection circuit 110 is not detected (No in S1015), and the discharge voltage of the time constant circuit 171 is the predetermined threshold voltage or more (No in S1017), the operation goes back to S1015. In summary, the determination circuit 150 determines whether the rising of the detection signal is detected in the period ΔT4. When the state transition from the "no-signal-detection-state" to the "signal-detection-state" of the detection circuit 110 is not detected (No in S1015), and the discharge voltage of the time constant circuit 171 is lower than the predetermined threshold voltage (Yes in S1017), the operation goes back to the initial state (S1001). In other words, the determination circuit 150 determines that the rising of the detection signal is not detected in the period ΔT4, and the operation goes back to the initial state.

Figure 32:
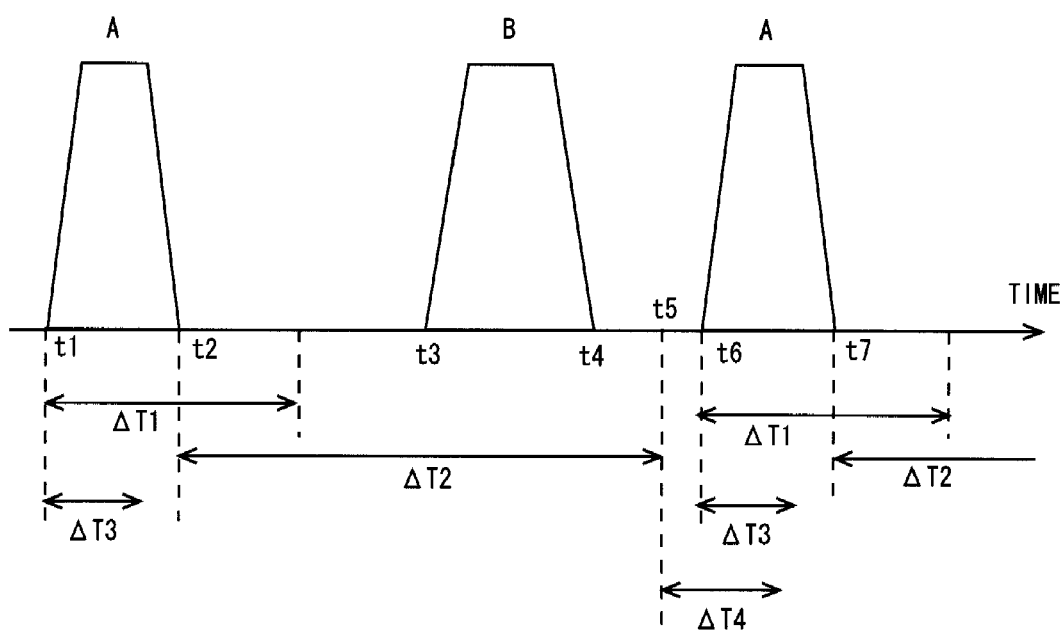
FIG. 32 shows a schematic diagram for describing the operation of the signal processing device according to the tenth exemplary embodiment.

FIG. 32 shows a schematic diagram describing the operation of the signal processing device 1000. FIG. 32 shows a relation among the signal from the discrimination circuit 120 corresponding to the detection signal of the detection circuit 110, the timer operation period ΔT1 of the timer 130 (discharge period of the time constant circuit 131), the timer operation period ΔT2 of the timer 140 (discharge period of the time constant circuit 141), the timer operation period ΔT3 of the timer 160 (discharge period of the time constant circuit 161), and the timer operation period ΔT4 of the timer 170 (discharge period of the time constant circuit 171).

As shown in FIG. 32, at time t1, the rising of the desired signal A is detected, and the period ΔT1 and the period ΔT3 are started. When the falling of the desired signal A is detected at time t2 in the period ΔT1 after the period ΔT3 ends, the counter 152 counts up, and the period ΔT2 is started. The determination circuit 150 cannot detect the rising or falling of the detection signal in the period ΔT2. Accordingly, even when the undesired signal B is input at time t3, the determination circuit 150 cannot detect the rising or falling of the undesired signal B at time t3, t4, and there is no change in the count value of the counter 152.

At time t5, the period ΔT2 ends, and the period ΔT4 is started at the same time. After that, the rising of the desired signal A is detected at time t6 in the period ΔT4, and the period ΔT1 and the period ΔT3 are started. When the falling of the desired signal A is detected at time t7 in the period ΔT1 after the period ΔT3 ends, the counter 152 counts up, and the period ΔT2 is started. The similar operation is repeated in the following process.

As described above, the signal processing device 1000 according to the tenth exemplary embodiment can determine the signal (signal A in FIG. 32) in which the burst signal whose duration time is longer than the period ΔT3 and shorter than the period ΔT1 is arranged with the interval longer than the period ΔT2 and the burst time length of the burst signal and shorter than the sum of the period ΔT2 and the discharge time (period ΔT4) of the time constant circuit 171 as the desired signal.

Accordingly, in the signal processing device 1000, the period ΔT4 can be freely set depending on the configuration of the time constant circuit 171. Thus, the variations of the period ΔT2, which is the parameter for discriminating the interval period of the burst signal which is the desired signal can be absorbed.

In the eighth or ninth exemplary embodiment, the period ΔT1 or the period ΔT3 plays a role of the period ΔT4. In this case, however, a design window may become narrow as the above role and the discrimination of the burst duration time of the burst signal need to be satisfied at the same time. In the signal processing device 1000 according to the tenth exemplary embodiment, this problem is solved by employing the timer 170.

Eleventh Exemplary Embodiment

Figure 33:
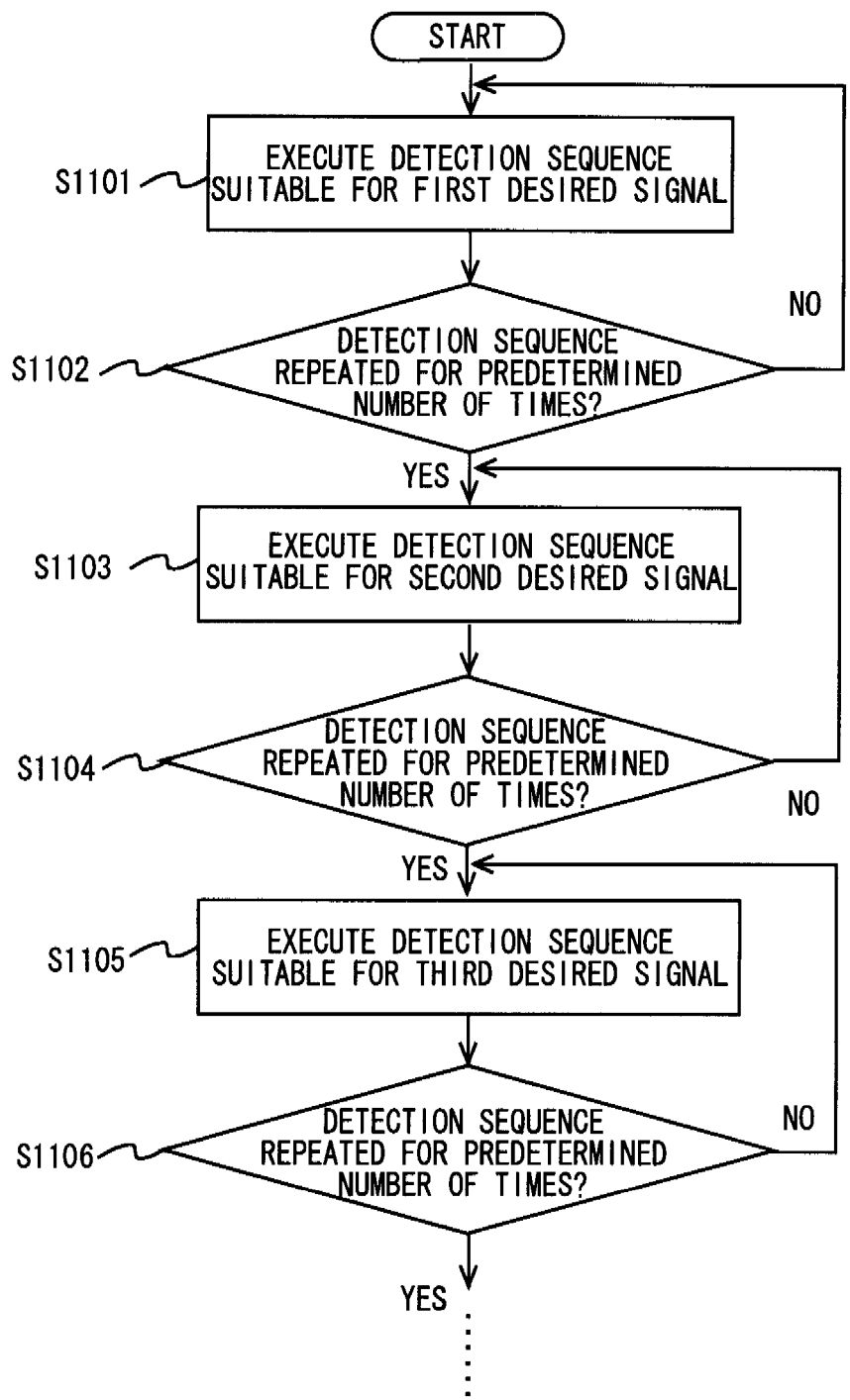
FIG. 33 shows a flow chart of the operation of a signal processing device according to an eleventh exemplary embodiment.

The specific eleventh exemplary embodiment to which the present invention is applied will be described hereinafter in detail with reference to the drawings. FIG. 33 shows a flow chart of the operation of a signal processing device 1100 according to the eleventh exemplary embodiment. First, the detection sequence suitable for the first desired signal is executed (S1101). This is repeated for a predetermined number of times (No in S1102).

Next, when repeated for the predetermined number of times (Yes in S1102), the detection sequence suitable for the second desired signal is executed (S1103). The operation of S1103 is repeated for the predetermined number of times (No in S1104).

Next, when repeated for the predetermined number of times (Yes in S1104), the detection sequence suitable for the third desired signal is executed (S1105). The operation of S1105 is repeated for the predetermined number of times (No in S1106). In the following operation, similarly, the detection sequences suitable for fourth, fifth, . . . , desired signals are repeated for the predetermined number of times.

The detection sequences suitable for the first, second, third, . . . , desired signals correspond to each operation flow chart described in the above exemplary embodiments, or an operation flow chart based on another aspect of the present invention. Accordingly, in the eleventh exemplary embodiment, the information regarding the type of the communication currently performed can be obtained by executing the detection flow chart (detection sequence) suitable for various communication types in order. This can be applied to the application such as a case where it is determined in which state the device should be activated when the wireless device corresponds to a plurality of systems, for example.

Twelfth Exemplary Embodiment

Figure 34:
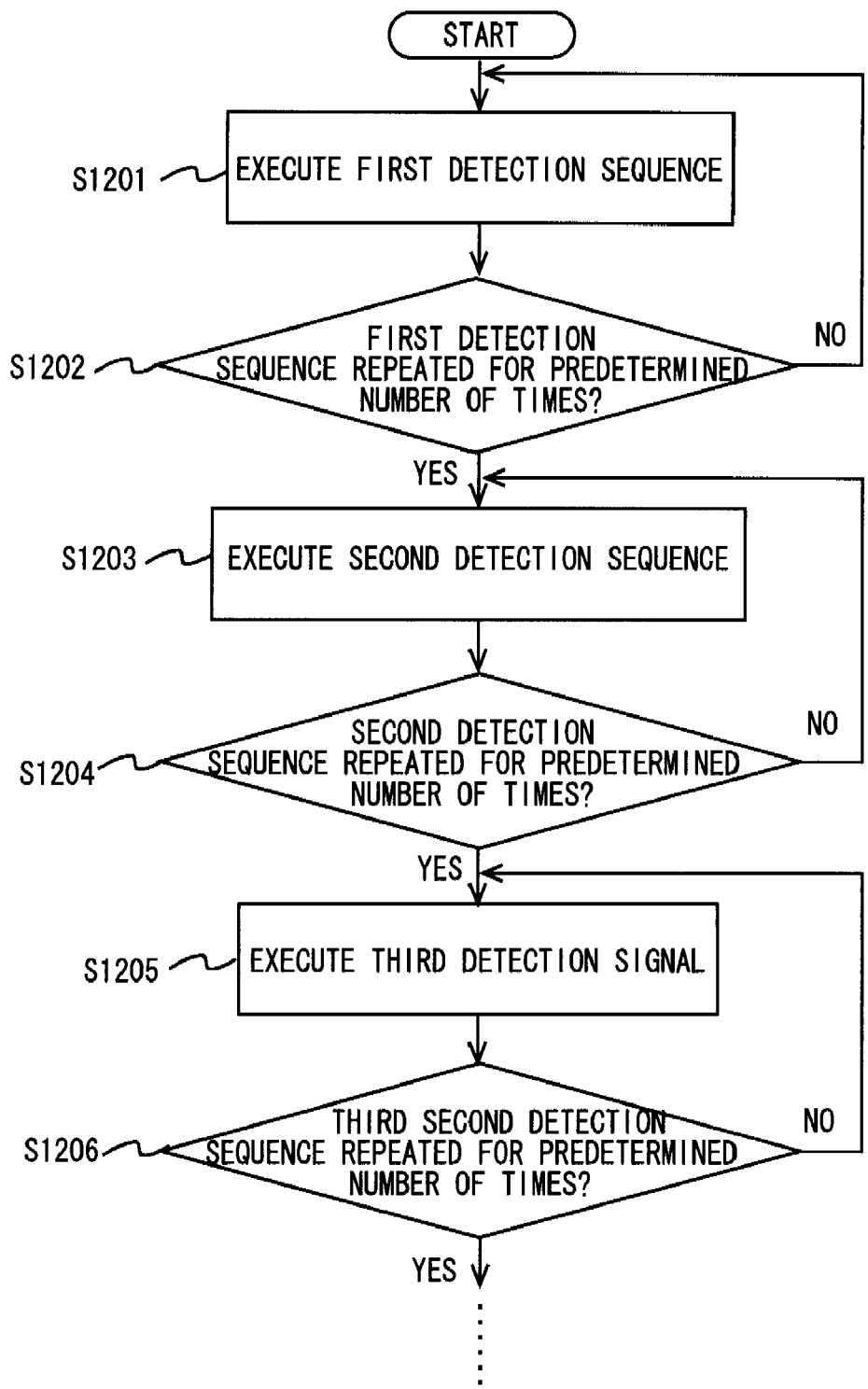
FIG. 34 shows a flow chart of the operation of a signal processing device according to a twelfth exemplary embodiment.

The specific twelfth exemplary embodiment to which the present invention is applied will be described hereinafter in detail with reference to the drawings. FIG. 34 shows a flow chart of the operation of a signal processing device 1200 according to the twelfth exemplary embodiment. First, the first detection sequence is executed (S1201). This is repeated for the predetermined number of times (No in S1202).

Next, when repeated for the predetermined number of times (Yes in S1202), the second detection sequence is executed (S1203). The operation of S1203 is repeated for the predetermined number of times (No in S1204).

When repeated for the predetermined number of times (Yes in S1204), the third detection sequence is executed (S1205). The operation of S1205 will be repeated for the predetermined number of times (No in S1206). In the following operation, similarly, the fourth, fifth, . . . , detection sequences are repeated for the predetermined number of times.

The first, second, third, . . . , detection sequences correspond to each operation flow chart described in the above exemplary embodiments, or an operation flow chart based on another aspect of the present invention. In the twelfth exemplary embodiment, the detection is executed based on various types of operation flow charts with respect to one communication method. The final detection determination may include a method of regarding the one detected by any one method as the detection result, or a method of regarding the one detected by a number of methods as the detection result. Accordingly, the probability of false detection or missing of detection can be reduced.

The first to twelfth exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A signal processing device, comprising:
    a detecting part that detects intensity of an input signal;
    a timer part that comprises a time constant circuit and measures time based on a time constant of the time constant circuit; and
    a determination circuit that counts the number of times of transition of the input signal detected by the detecting part within the time measured by the time constant circuit.

2. The signal processing device according to claim 1, wherein
    the detecting part outputs a detection signal of a first state when the input signal has a predetermined signal intensity or more, and outputs a detection signal of a second state when the input signal has intensity lower than the predetermined signal intensity,
    the timer part comprises a first time constant circuit that includes a first capacitor that is charged or discharged with a first time constant, the first time constant circuit further starting charge or discharge of the first capacitor and determining a period of the first time constant according to a first trigger signal, and
    the determination circuit further comprises a first counter, and outputs the first trigger signal to the first time constant circuit and counts the number of detection signals that are detected within the period of the first time constant and switches from the second state to the first state by the first counter when the detection signal is switched from the second state to the first state.

3. The signal processing device according to claim 2, wherein the determination circuit determines whether a count value of the first counter is within a predetermined range.

4. The signal processing device according to claim 2, wherein the determination circuit further comprises a second counter, and changes a count value of the second counter, resets a value of the first counter, and determines whether the count value of the second counter is a predetermined value when a count value of the first counter is within a predetermined range.

5. The signal processing device according to claim 2, wherein
    the timer part comprises a second time constant circuit that includes a second capacitor that is charged and discharged with a second time constant, the second time constant circuit further starting charge or discharge of the second capacitor and determining a period of the second time constant according to a second trigger signal, and
    the determination circuit further comprises a second counter, and changes a count value of the second counter, resets a value of the first counter, and outputs the second trigger signal when a count value of the first counter within a period of the first time constant reaches a predetermined value.

6. The signal processing device according to claim 2, wherein
    the timer part comprises a second time constant circuit that includes a second capacitor that is charged and discharged with a second time constant, the second time constant circuit further starting charge or discharge of the second capacitor and determining a period of the second time constant according to a second trigger signal, and
    the determination circuit further comprises a second counter, and changes a count value of the second counter, resets a value of the first counter, and outputs the second trigger signal when a count value of the first counter at a time when a period of the first time constant ends is within a predetermined range.

7. The signal processing device according to claim 5, wherein the determination circuit performs the following operations of:
    outputting the first trigger signal after termination of the period of the second time constant;
    counting the number of detection signals that are switched from the second state to the first state by the first counter in a period of the first time constant that is started again, and changing the count value of the second counter and outputting the second trigger signal when the count value is equal to a predetermined value or within a predetermined range, and
    determining whether the count value of the second counter is a predetermined value.

8. The signal processing device according to claim 6, wherein the determination circuit performs the following operations of:
    outputting the first trigger signal after termination of the period of the second time constant;
    counting the number of detection signals that are switched from the second state to the first state by the first counter in a period of the first time constant that is started again, and changing the count value of the second counter and outputting the second trigger signal when the count value is equal to a predetermined value or within a predetermined range, and
    determining whether the count value of the second counter is a predetermined value.

9. The signal processing device according to claim 2, wherein
    the timer part comprises a second time constant circuit that includes a second capacitor that is charged and discharged with a second time constant, the second time constant circuit further starting charge or discharge of the second capacitor and determining a period of the second time constant according to a second trigger signal, and
    the determination circuit further comprises a second counter, and changes a count value of the second counter, and outputs the second trigger signal when a count value of the first counter in the period of the first time constant is a predetermined value and the detection signal that is switched from the first state to the second state is detected.

10. The signal processing device according to claim 9, wherein the determination circuit performs the following operations of:
    outputting the first trigger signal after termination of the period of the second time constant;

changing the count value of the second counter and outputting the second trigger signal when the detection signal that is switched from the second state to the first state is detected within the period of the first time constant that is started again; and determining whether the count value of the second counter is a predetermined value.

11. The signal processing device according to claim 2, wherein the timer part comprises a second time constant circuit that includes a second capacitor that is charged and discharged with a second time constant, the second time constant circuit further starting charge or discharge of the second capacitor and determining a period of the second time constant according to a second trigger signal, and the determination circuit further comprises a second counter, and changes a count value of the second counter and outputs the second trigger signal when a count value of the first counter at a time when the period of the first time constant ends is a predetermined value and the detection signal is in the second state.

12. The signal processing device according to claim 11, wherein the determination circuit performs the following operations of:

outputting the first trigger signal after termination of the period of the second time constant;

changing the count value of the second counter and outputting the second trigger signal when the number of detection signals that are switched from the second state to the first state in the period of the first time constant that is started again is a predetermined value; and determining whether the count value of the second counter is a predetermined value.

13. The signal processing device according to claim 1, wherein the detecting part outputs a detection signal of a first state when the input signal has a predetermined signal intensity or more, and outputs a detection signal of a second state when the input signal has intensity lower than the predetermined signal intensity, the timer part comprises:

a first time constant circuit that includes a first capacitor that is charged and discharged with a first time constant, the first time constant circuit further starting charge or discharge of the first capacitor and determining a period of the first time constant according to a first trigger signal;

a second time constant circuit that includes a second capacitor that is charged or discharged with a second time constant, the second time constant circuit further stating charge and discharge of the second capacitor and determining a period of the second time constant according to a second trigger signal; and a third time constant circuit that includes a third capacitor that is charged and discharged with a third time constant that is shorter than the first time constant, the third time constant circuit further starting charge or discharge of the third capacitor and determining a period of the third time constant according to a third trigger signal, and the determination circuit further comprises a second counter, concurrently outputs the first trigger signal and the third trigger signal, stops operation of the determination circuit when the detection signal that is switched from the first state to the second state is detected within a period of the third time constant, and changes a count value of the second counter and outputs the second trigger signal when the detection signal that is switched from the first state to the second state is detected within a period of the first time constant after termination of the period of the third time constant.

14. The signal processing device according to claim 13, wherein the determination circuit performs the following operations of:

outputting the first trigger signal after termination of the period of the second time constant;

outputting the third trigger signal when the detection signal that is switched from the second state to the first state is detected within the period of the first time constant that is started again;

outputting the second trigger signal and changing the count value of the second counter when the detection signal that is switched from the first state to the second state is detected within the period of the first time constant that is started again after termination of the period of the third time constant that is started again; and determining whether the count value of the second counter is a predetermined value.

15. The signal processing device according to claim 13, wherein the timer part comprises a fourth time constant circuit that includes a fourth capacitor that is charged and discharged with a fourth time constant, the fourth time constant circuit further starting charge or discharge of the fourth capacitor and determining a period of the fourth time constant according to a fourth trigger signal, and the determination circuit outputs the fourth trigger signal after termination of the period of the second time constant, outputs the first and third trigger signals when the detection signal that is switched from the second state to the first state is detected in the period of the fourth time constant, outputs the second trigger signal and changes the count value of the second counter when the detection signal that is switched from the first state to the second state is detected within the period of the first time constant that is started again after termination of the period of the third time constant that is started again, and determines whether the count value of the second counter is a predetermined value.

16. The signal processing device according to claim 13, wherein the determination circuit performs the following operations of:

outputting the third trigger signal after termination of the period of the second time constant;

outputting the first trigger signal when the detection signal that is switched from the second state to the first state is detected within the period of the third time constant that is started again;

outputting the second trigger signal and changing the count value of the second counter when the detection signal that is switched from the first state to the second state is detected within the period of the first time constant that is started again after termination of the period of the third time constant that is started again; and determining whether the count value of the second counter is a predetermined value.

17. The signal processing device according to claim 1, wherein the detecting part outputs a detection signal of a first state when the input signal has a predetermined signal intensity or more, and outputs a detection signal of a second state when the input signal has intensity lower than the predetermined signal intensity, the timer part comprises a second time constant circuit that includes a second capacitor that is charged and discharged with a second time constant, the second time constant circuit further starting charge or discharge of the second capacitor and determining a period of the second time constant according to a second trigger signal, and the determination circuit comprises a second counter, detects the detection signal that is switched from the second state to the first state to output the second trigger signal, and changes a count value of the second counter.

18. The signal processing device according to claim 17, wherein the timer part comprises a first time constant circuit that includes a first capacitor that is charged and discharged with a first time constant, the first time constant circuit further starting charge or discharge of the first capacitor and determining a period of the first time constant according to a first trigger signal, and the determination circuit outputs the first trigger signal after termination of the period of the second time constant, changes the count value of the second counter and outputs the second trigger signal when the detection signal that is switched from the second state to the first state is detected in the period of the first time constant, and determines whether the count value of the second counter is a predetermined value.

* * * * *